United States Patent [19]

Chan et al.

[11] 4,400,770
[45] Aug. 23, 1983

[54] CACHE SYNONYM DETECTION AND HANDLING MEANS

[75] Inventors: Shiu K. Chan; John A. Gerardi, both of Poughkeepsie; Bruce L. McGilvray, Pleasant Valley, all of N.Y.

[73] Assignee: International Business Machines Corporation, Armonk, N.Y.

[21] Appl. No.: 205,486

[22] Filed: Nov. 10, 1980

[51] Int. Cl.³ .................................................. G06F 13/00
[52] U.S. Cl. ..................................................... 364/200
[58] Field of Search ................................. 364/200, 900

[56] References Cited

U.S. PATENT DOCUMENTS

| | | | |
|---|---|---|---|
| 3,723,976 | 3/1973 | Alvarez et al. | 364/200 |
| 4,096,573 | 6/1978 | Heller et al. | 364/200 |
| 4,136,385 | 1/1979 | Gannon et al. | 364/200 |
| 4,332,010 | 5/1982 | Messina et al. | 364/200 |

Primary Examiner—Mark E. Nusbaum
Assistant Examiner—Michael R. Fleming
Attorney, Agent, or Firm—Bernard M. Goldman

[57] ABSTRACT

The disclosure detects and handles synonyms for a store-in-cache (SIC). A processor cache directory (PD) is searched in a principle class addressed by a subset of bits taken from a processor request's logical address. The class address has both translatable and non-translatable bits. If any of the set-associative line entries in the principle class contains the request's translated address, the data is accessed in a corresponding line location in the cache. If the principle class does not have any entry with the request's translated address, a cache miss signal occurs which causes a line fetch command to be generated for main storage to fetch the required line. The line fetch command also causes synonym search circuits to generate the address of every potential synonym class by permutating the translatable bits in the principle class address provided in the line fetch command. Then each potential synonym class is accessed in a copy directory (CD) (which is a copy of essential information in all entries in PD) and compared to the translated request address in order to detect for any existing synonym. Each line entry in the PD and CD also has an exclusive (EX) shareability control bit which controls the handling of a request after detection of a synonym in the CD. If the EX bit is off representing a read only (RO) state, the line cannot be locked during any checkpoint interval. Then the data is not accessed in the detected synonym location, but instead the RO line is copied into an entry in the principle class to improve system performance due to subsequent requests expected to the same line. The synonym line is not invalidated unless the processor is requesting the data exclusively (EX). If the EX bit is on representing an exclusive state in a found synonym entry, the line may be locked in the cache during a checkpoint interval, and therefore the data is accessed in the detected synonym location in the SIC because it cannot then be moved.

15 Claims, 46 Drawing Figures

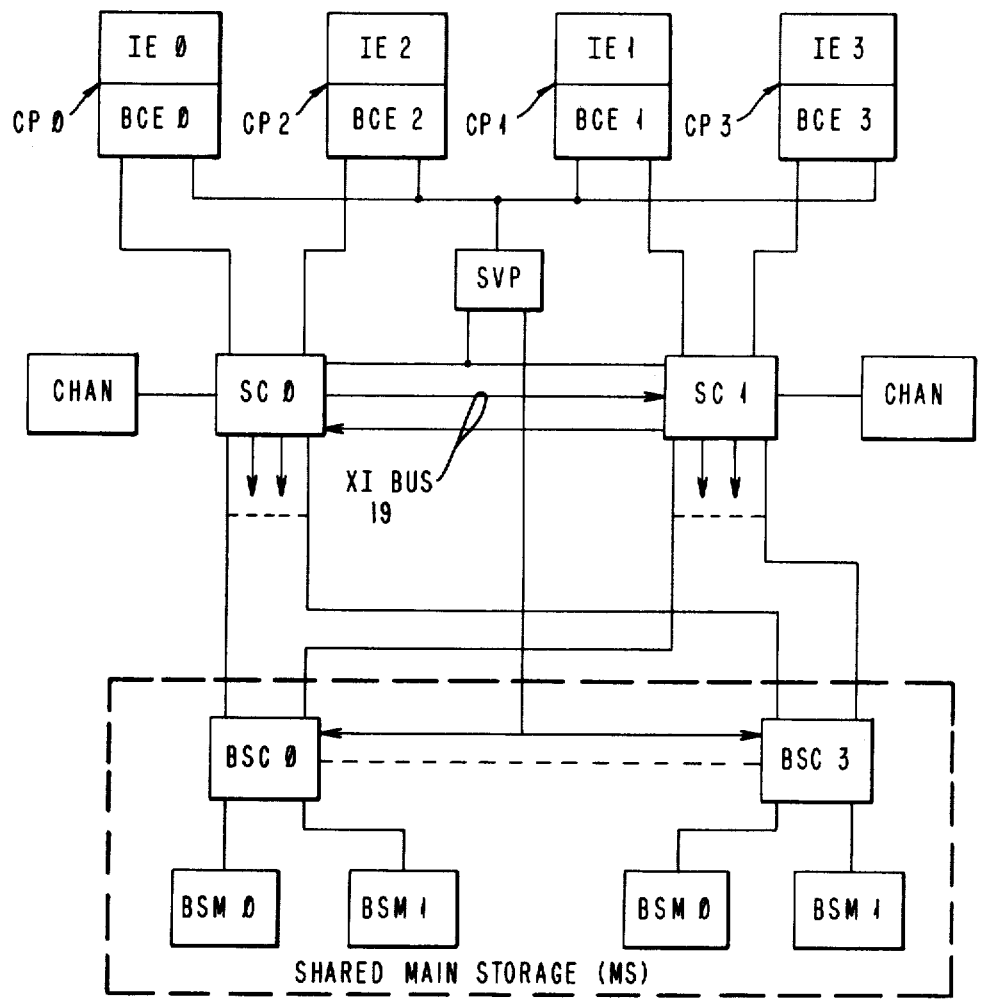

FIG.3A
IE CMD TO BCE

| PSW STORAGE KEY | LOGICAL ADDRESS | SI REQ | FETCH REQ | EX (RO) REQ | STORE CACHE SIG |
|---|---|---|---|---|---|
| (4 BITS) | (32 BITS) | (1 BIT) | (1 BIT) | (1 BIT) | (1 BIT) |

FIG.3B
BCE MISS CMD TO SC

| PSW STORAGE KEY | LOG BIT(S) 19,20 | ABS ADDR | //// | PD SET (LRU RESULT) | OP CODE (LINE FETCH) | DW LNTH | SI REQ | EX SIG | PROC ID |
|---|---|---|---|---|---|---|---|---|---|
| (4 BITS) | (2 BITS) | (26 BITS) | | (4 BITS) | (8 BITS) | (4 BITS) | (1 BIT) | (1 BIT) | (2 BITS) |

FIG.3C
SC CMDS TO BCE

| CD CLASS | CD SET | INV CMD | ARO CMD | CO CMD |
|---|---|---|---|---|
| (6 BITS) | (4 BITS) | (1 BIT) | (1 BIT) | (1 BIT) |

FIG.3D
BCE DIRECTORY CMDS TO SC

| PSW STORAGE KEY | LOG BITS 19,20 | ABS ADDR | PD CLASS | PD SET | OP CODE (FOR CO, ILE, OR CERO) | DW LGTH | //// | PROC ID |
|---|---|---|---|---|---|---|---|---|
| (4 BITS) | (2 BITS) | (26 BITS) | (6 BITS) | (4 BITS) | (8 BITS) | (4 BITS) | | (2 BITS) |

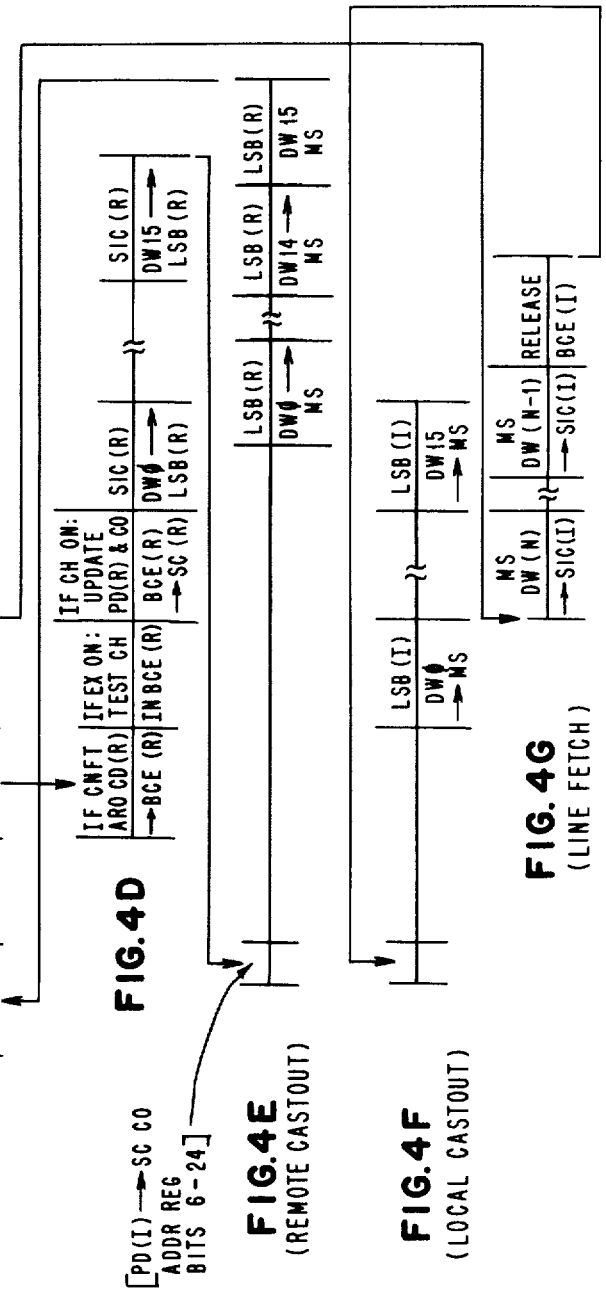

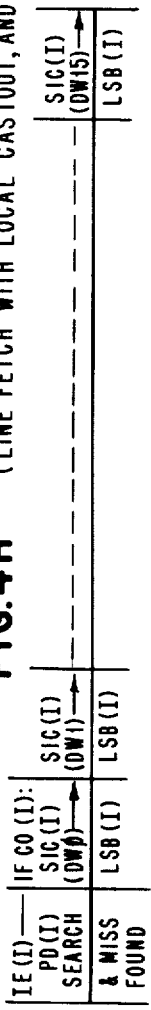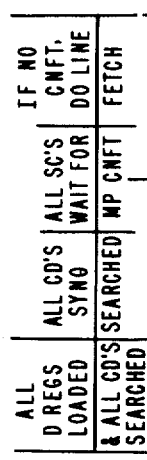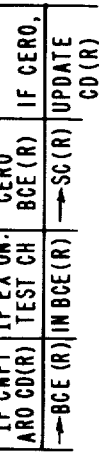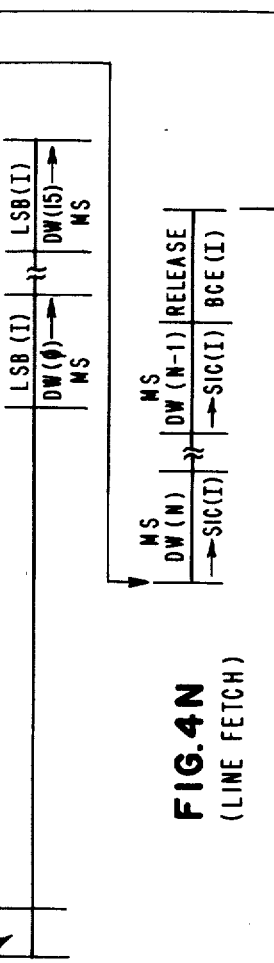

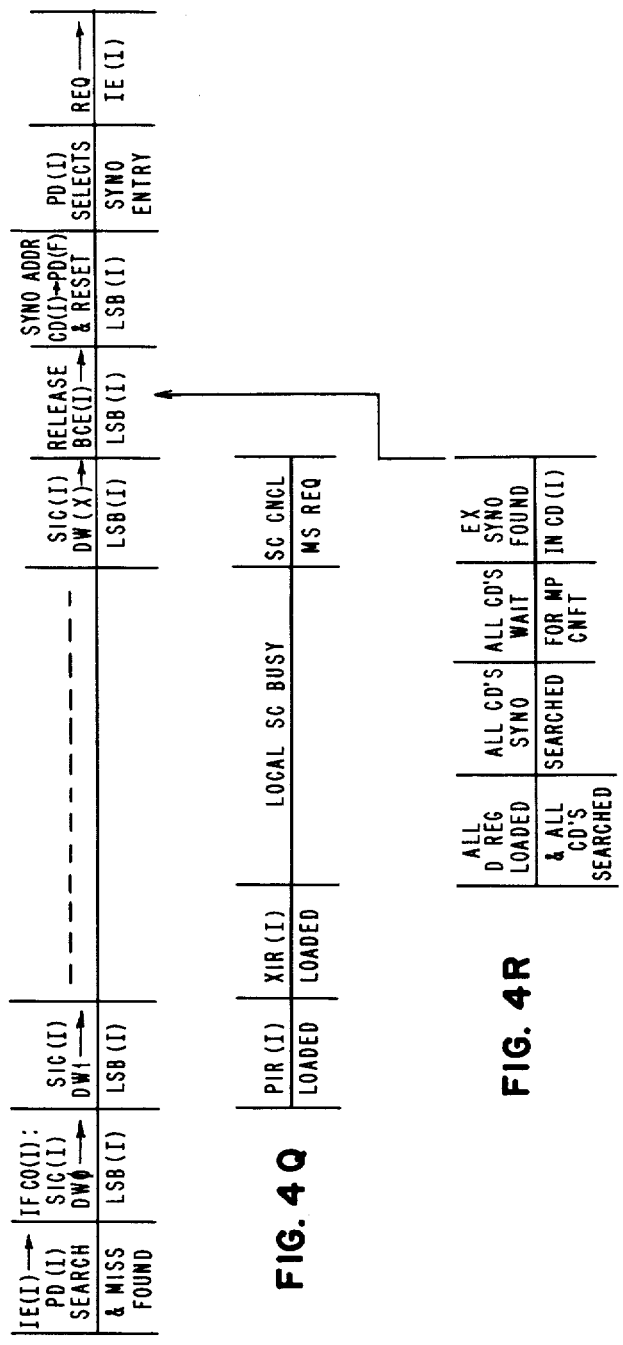

FIG. 4S RO SYNONYM IN CD (I)

FIG. 4W (LINE FETCH)

FIG. 4X (LOCAL LSB CASTOUT)

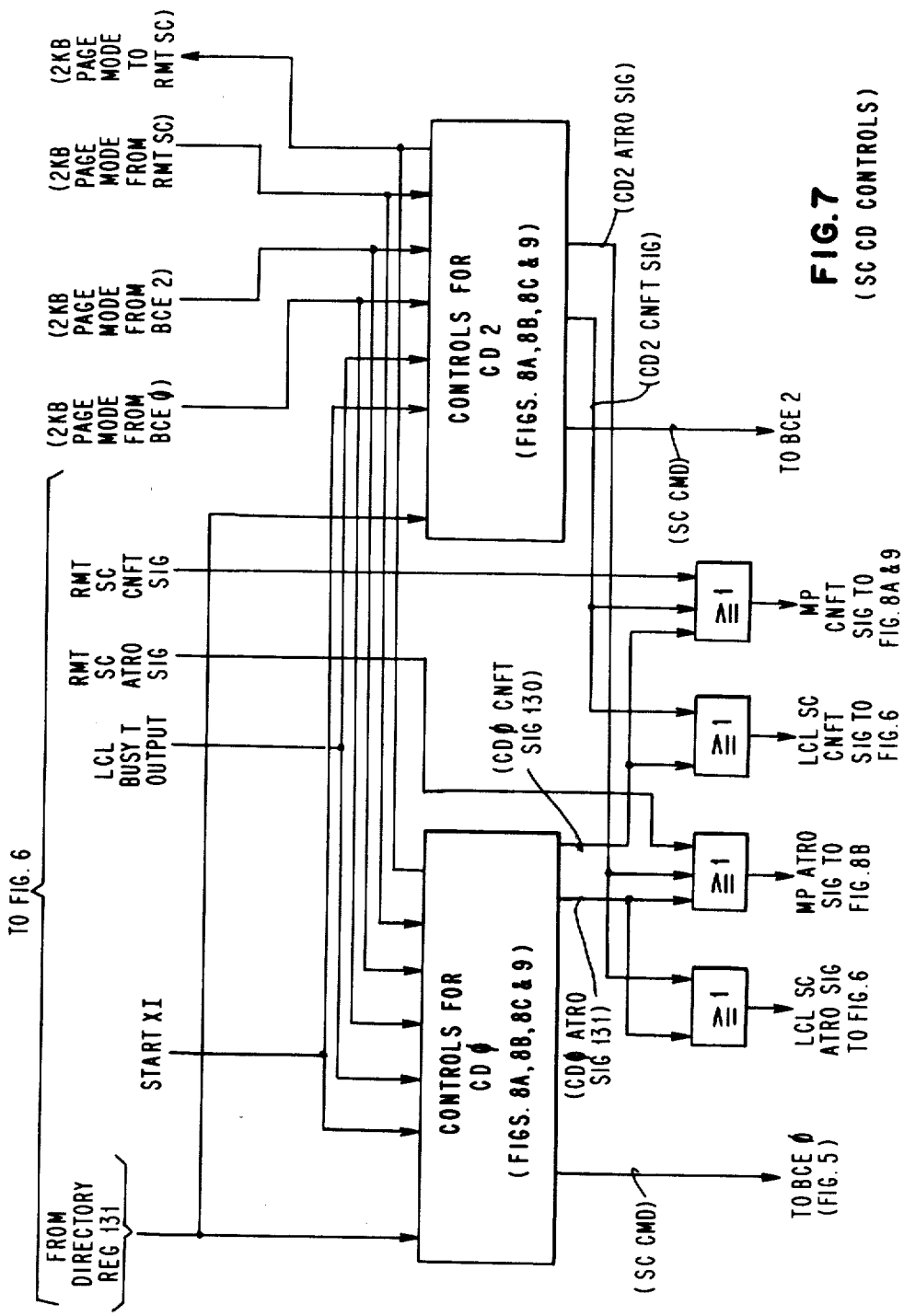

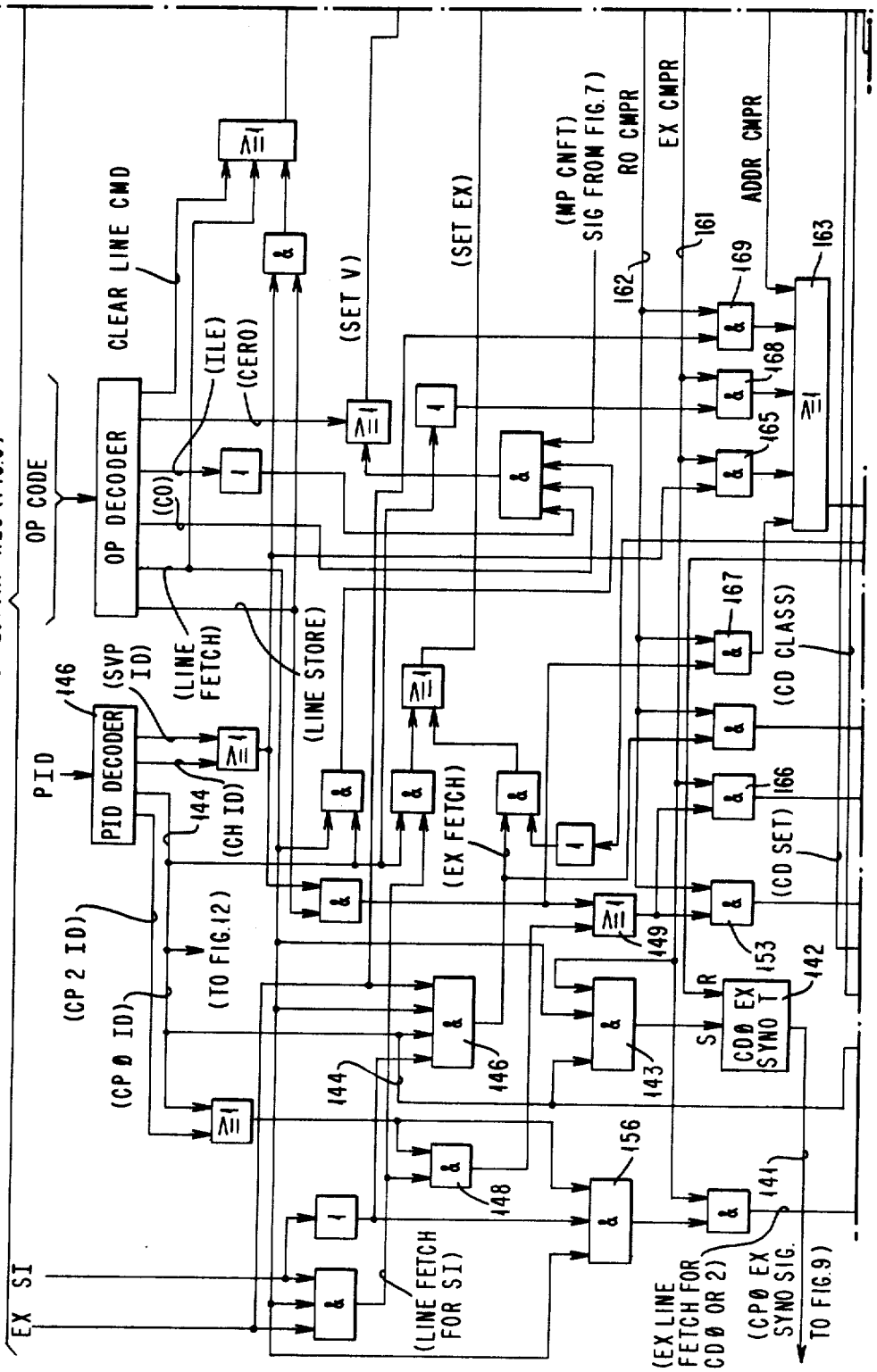

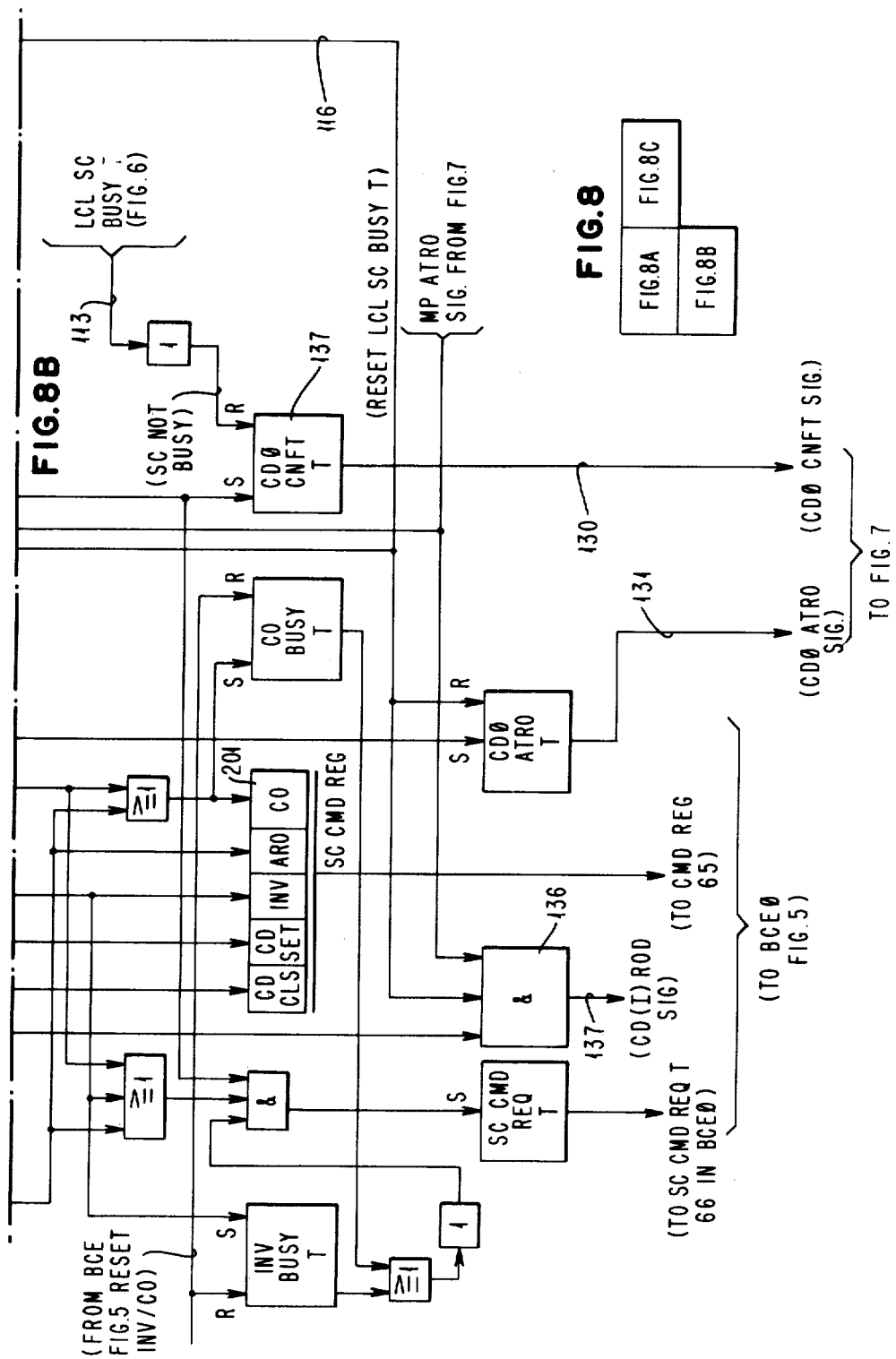

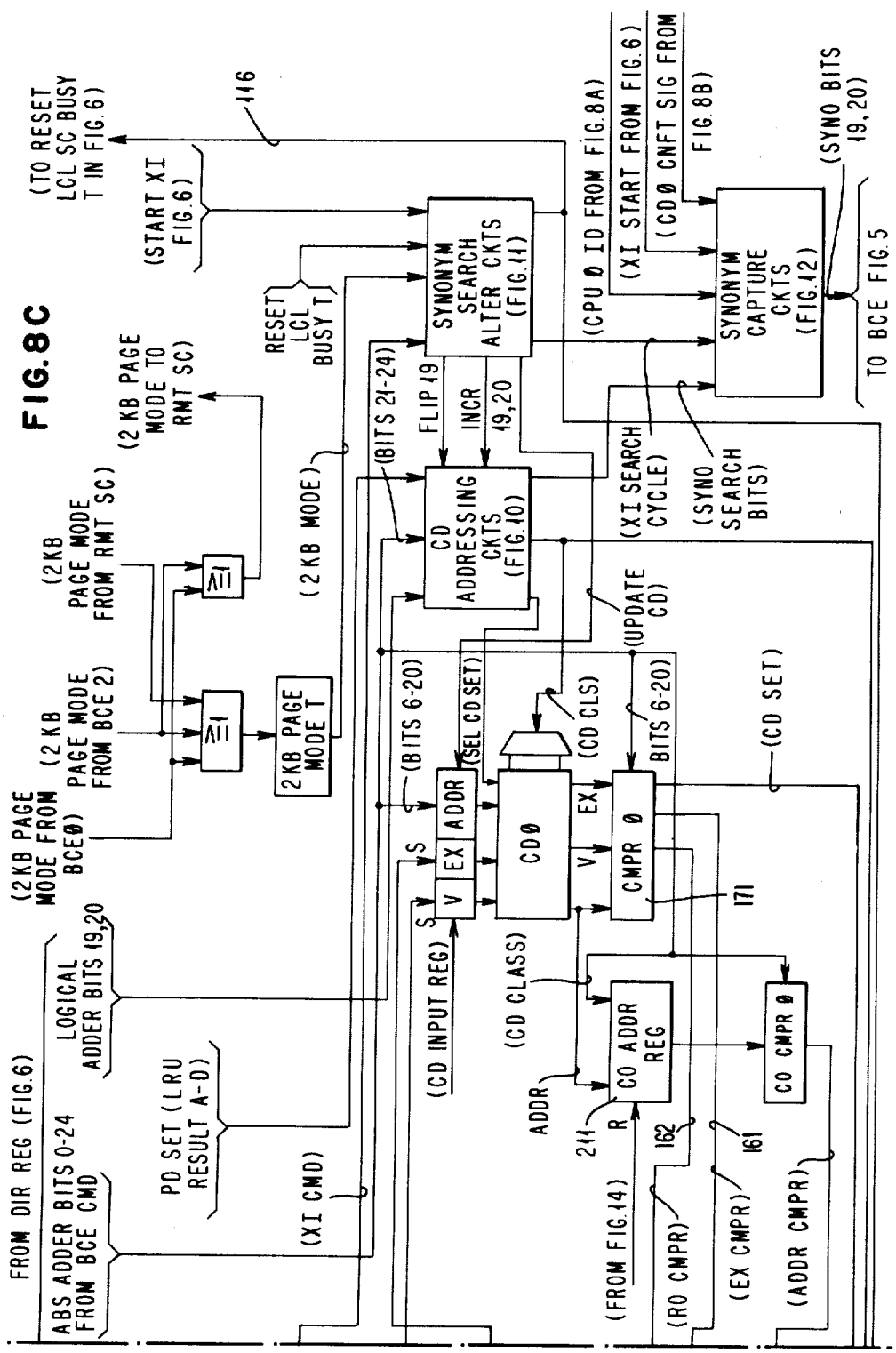

(SC RELEASE AND STATUS CIRCUITS)

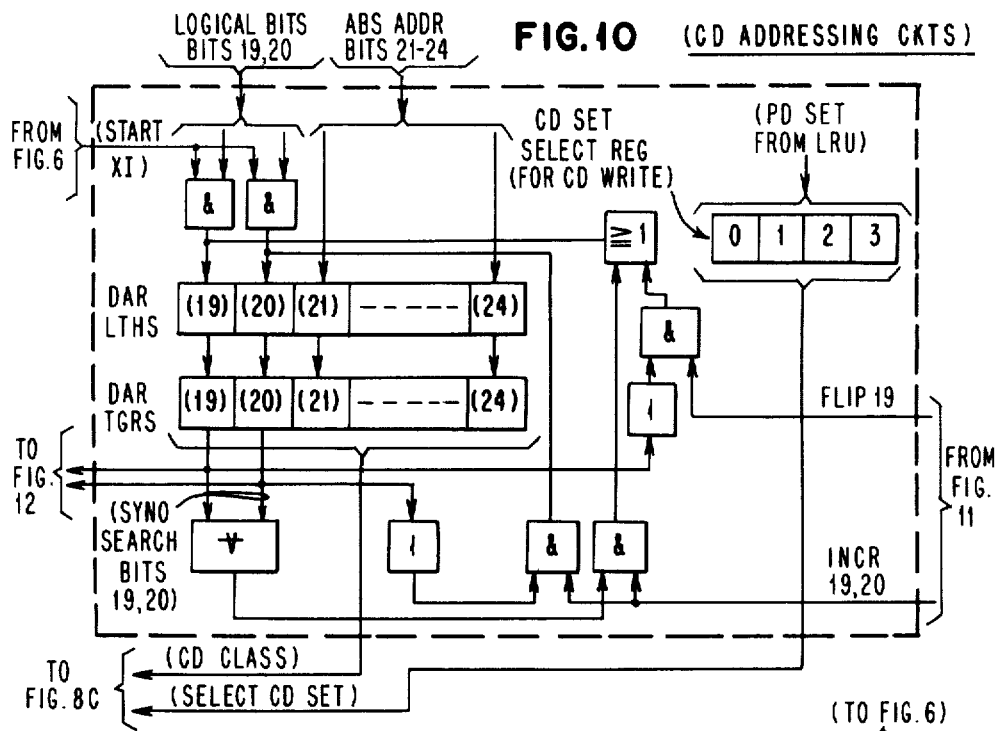
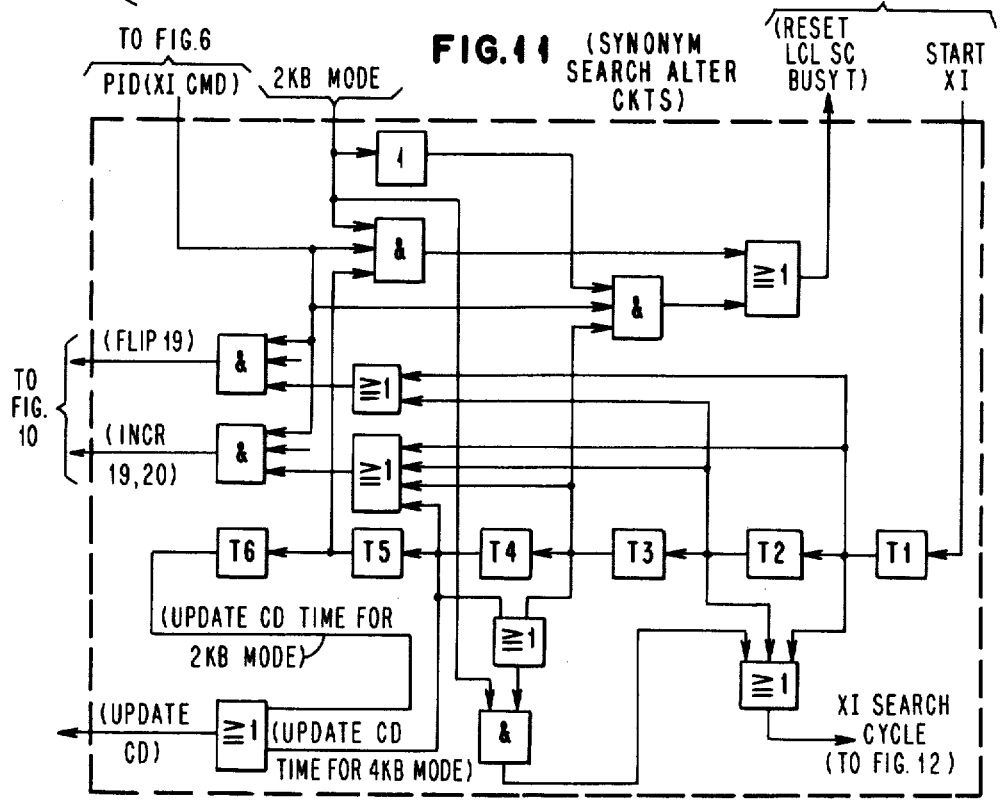

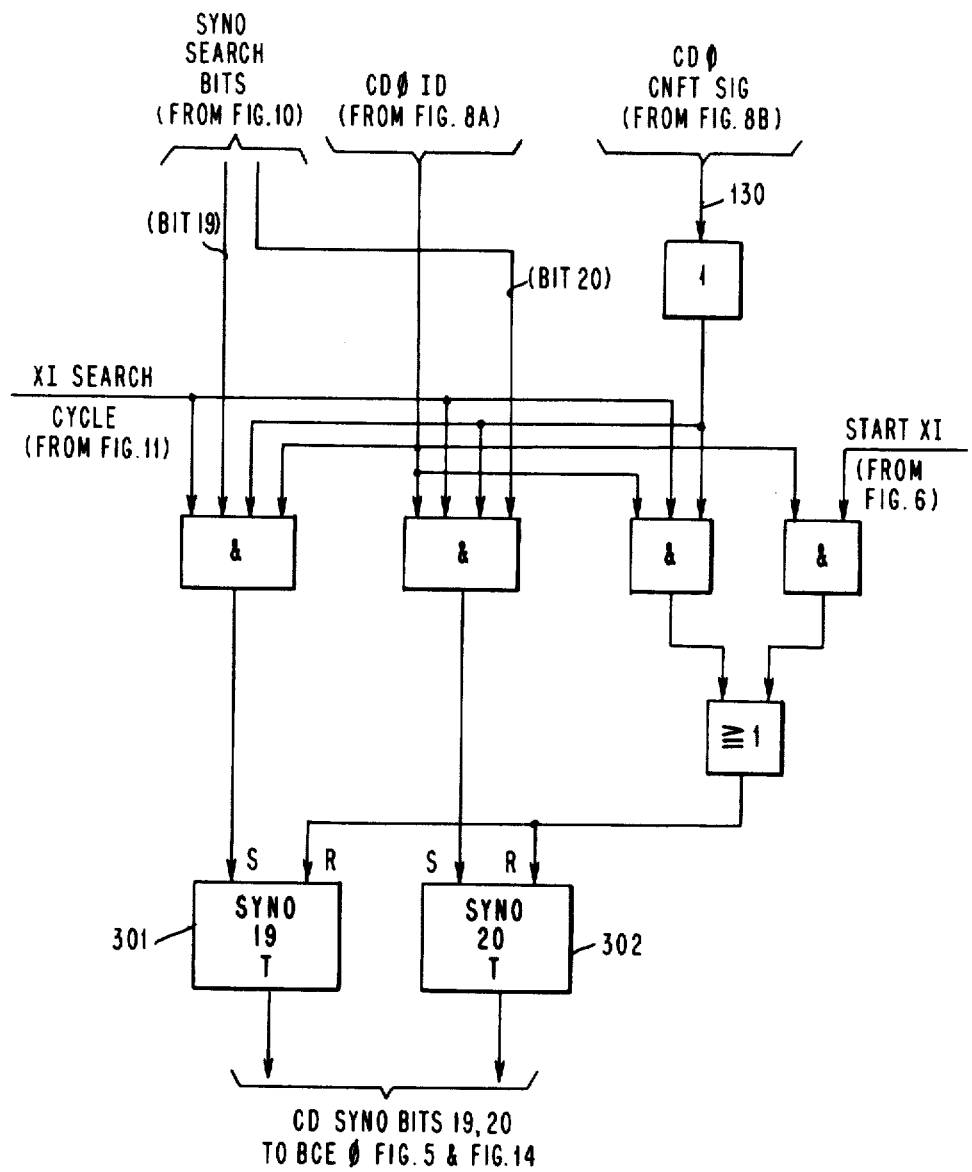
FIG.12 (SYNO CAPTURE CIRCUITS)

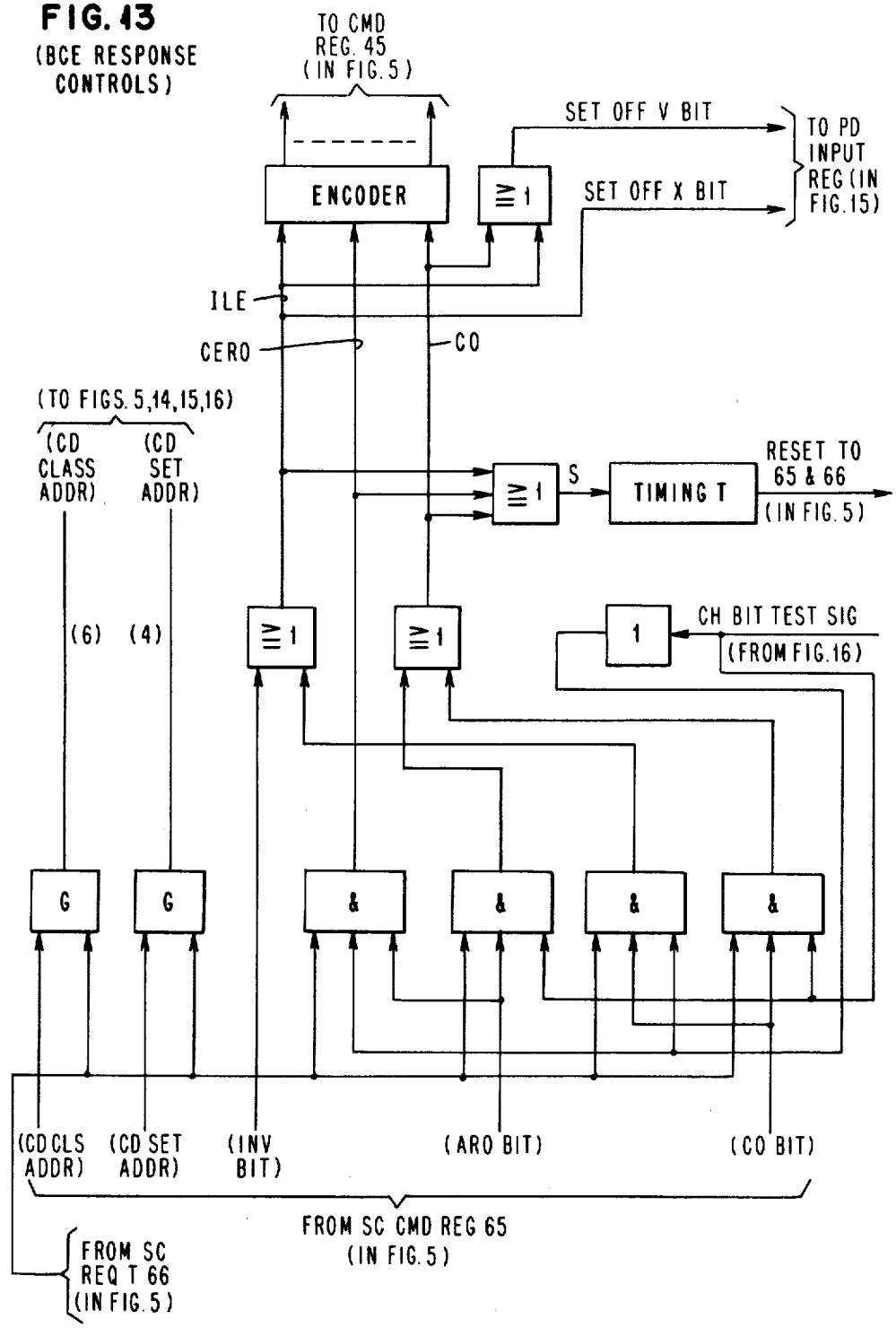
FIG. 13 (BCE RESPONSE CONTROLS)

(PD CLASS ADDRESSING CONTROL CIRCUITS IN BCE)

FIG. 15 (PD SET INPUT CONTROLS)

FIG.16 (CHANGE BIT TEST CIRCUIT)

CACHE SYNONYM DETECTION AND HANDLING MEANS

BACKGROUND OF THE INVENTION

1. Field of the Invention

This invention relates generally to the field of digital computers and more particularly to the area of memory hierarchy control within a computer. More specifically it relates to a snyonym detection and handling mechanism for caches in a virtual storage system.

A cache synonym is a cache directory entry defined as containing an absolute address translated from a current request's logical address which does not directly locate any entry in the directory containing this absolute address.

This application includes the disclosed subject matter in U.S.A. patent application Ser. No.: 205,500 filed on Nov. 10, 1980 by F. O. Flusche et al and assigned to the same assignee as the subject application.

2. Description of the Prior Art

In a data processing system with a storage hierarchy, selected lines of data in a main storage are copied in a high speed buffer, often called a cache, for fast access by a processor. Whenever the processor requests data, the system first checks the cache to determine whether the data is available in the cache; and if it is, the data is quickly provided to the processor. If the data is not available in the cache, the data is retrieved more slowly from the main memory. A portion of the untranslated logical address in each processor request is used to directly address the cache directory, rather than use its translated absolute address because system performance is significantly decreased by waiting for the translated address.

Caches in current systems are typically based on the concept of "set associativity", wherein a requestor directly addresses a cache directory row (called a class) which may have several entries (called sets). The sets in a class are all associatively searched in parallel to determine if any one set in the class has the absolute (or real) address translated for the requested logical (or virtual) address. A set-associative cache is a compromise between a slowly-performing fully associative cache, in which any block of main storage may map into any position in the cache, and a fast-performing directly addressed cache, where each main storage address can map into only one class location in the cache. Fully associative caches have the liability of lengthy directory search time and an elaborate replacement (LRU) mechanism. Non-associatively addressed caches are the simplest to implement in terms of hardware, but yield significantly lower performance than the other two schemes due to increased overwriting of entries.

The size of a set-associative cache can be increased by either (1) increasing the number of classes in the cache directory by increasing the address range used to access a cache class, and/or (2) increasing the number of sets in each class. If system performance is not to be decreased, an increase in the set associativity requires extra hardware to examine all sets in the addressed class in parallel. Also, available integrated circuit packaging technology for cache directories does not easily lend itself to a substantial increase in set associativity. The constraints prefer that the cache size be increased by increasing the number of classes in the cache directory. However, as the number of classes in the cache directory is increased, eventually the directory address bits taken from a requesting logical address must expand beyond its nontranslatable field (i.e. the D field) and into its translatable field.

The cache synonym problem occurs when the cache address uses bits from the translatable field of the logical address. A cache synonym exists when the data required by a requesting logical address is available in a cache class different from the class addressed by the request. Synonyms may for example be caused by (1) requests which switch between virtual and real addresses for the same data, or (2) by one user addressing a line of data with one virtual address and another user addressing the same line with a different virtual address which locates a different class in the cache, or (3) by reassignment of the page frame to be accessed by a logical address.

A random relationship exists between a logical address and its translated absolute address. This relationship is dependent upon the assignment of a logical address to any available page frame in main storage. Thus, a given logical address can translate to any absolute address in main storage where the assigned page frame happens to be located.

Accordingly, the values of the translated bits in an absolute address are only determined at the time of translation and they may have any value. Thus, the value in any subset of bit positions in the translatable field of an absolute address is not dependent upon the value in the corresponding subset of bit positions in the related logical address; and they may have any value within the range of their permutations.

U.S. Pat. No. 3,723,976 to Alvarez et al, issued Mar. 27, 1973 and assigned to the same assignee as the subject application, teaches a different cache synonym technique not used in the subject application. In Alvarez, each processor (which is shown in a multiprocessing environment) has associated with it a store-in-cache, a fetch directory (FD), a broadcast store directory (BSD), and a translation directory (TD). An entry in the FD is accessed by the logical (virtual) address bits 18–26 of a processor request, but the corresponding entry in the BSD is accessed by real address bits 18–26 obtained from TD as a translation of the requested logical address. Hence, the BSD is not a copy directory of the FD, because the corresponding entries in BSD and FD for the same processor request can map to different locations in BSD and FD. The FD entries contain real addresses (bits 8–19), while the BSD entries contain a mixture of real and virtual address bits (i.e. real bits 8–17 and virtual bits 18, 19), in which the BSD virtual bits 18,19 point to the corresponding entry in the FD. The virtual bits 18,19 in a BSD entry locate a corresponding FD entry. The result is that a principle class is accessed in FD using the request address; and if the request misses in FD, BSD is then examined to determine if any synonym location exists in FD and therefore in the cache. A double replacement invalidation problem exists for U.S. Pat. No. 3,723,976 which is not found in the subject invention and is caused by corresponding entries in BSD and FD not being at the same directory address. The double replacement invalidation may occur when any valid FD entry is replaced by a new entry. This single FD entry replacement causes the invalidation of two FD entries and two BSD entries in the example in Alvarez FIG. 7 which requires two invalidations and two block castouts from the cache when the invalidated blocks were change. This double invalidation occurs when the new and replaced corresponding BSD entries are in different BSD locations. For any new FD entry, four possible corresponding BSD locations exist due to the four possible translatable values for virtual bits 18,19. Hence, the replaced BSD entry corresponding to the replaced FD entry, and the new BSD entry corresponding to the new FD entry have a three out of four chance of occupying different BSD locations than the same BSD location.

A result of Alvarez potential double replacement castout is duplication of attendant hardware, e.g. duplication of the line store buffers, duplication of related RAS hardware entities for castout, etc., and most of all the significant decrease in main storage (MS) performance due to cluttering the bus to MS with additional castouts, using up unnecessary bandwidth.

There is no double replacement invalidation or double replacement castout with the subject invention, due to its use of a copy directory (CD) and processor directory (PD) combination instead of the FD and BSD combination used in the Alvarez patent, because corresponding CD and PD entries always map into the same address in both PD and CD, unlike in Alvarez FD and BSD. Also, the subject invention is capable of performing synonym detection with only a single directory, i.e. in the PD.

U.S. Pat. No. 4,332,010 issued May 25, 1982 entitled "Cache Synonym Detection and Handling Mechanism" by B. U. Messina et al (assigned to the same assignee as the subject application) detects synonyms by constructing a cache directory in a novel manner that divides the directory into $2^N$ groups of classes in which N is the number of translatable bits in the cache directory address for locating any class in the directory. Each of the $2^N$ groups in the directory is addressed in parallel by the current processor request. Each group has the potential for containing either a principle cache hit or a synonym hit, although only one of them may be put in the directory and cache. A cache miss occurs when no principle or synonym cache hit is found in any group. No copy directory is used in detecting a cache synonym, as is done in the invention in the subject application.

U.S. Pat. No. 4,136,385 to Gannon et al, issued Jan. 23, 1979, and assigned to the assignee of the present application, is concerned with the dynamic lookaside address translation (DLAT) synonym problem. The DLAT synonym problem is not related to the cache synonym problem with which the subject invention is involved. The Gannon patent provides a control means for handling common-segment DLAT synonyms used with multiple virtual storage systems in which a common page has the same virtual address in plural address spaces. The control means eliminates plural entries for a common page in a translation lookaside buffer (DLAT) by providing a common indicator in each DLAT entry containing a common page address to eliminate associating the entry with any particular address space.

IBM Maintenance Library, "3033 Processor Complex, Theory of Operation/Diagram Manual" Vol 4, Processor Storage Control Function (PSCF) and Processor Storage, Form SY22-7004-0, pages 1.4.1 and 1.6.2 show and describe a large high speed buffer concept, in which a sixteen-way set associative cache is used to avoid the synonym problem by avoiding the use of any translatable bits from the processor request logical address for addressing the cache directory.

SUMMARY OF THE INVENTION

It is an object of this invention to provide a synonym accessing means for a cache which will detect a synonym at any synonym location which can exist in a set-associative cache directory used in a uniprocessor or multiprocessor.

It is a further object of this invention to perform synonym detection in a requesting processor's copy directory at the same time cross-interrogation detection is being performed in the copy directories of other processors in a multiprocessing system.

It is a still further object of the present invention to obtain an overlap in the synonym detection machine cycles with the cross-interrogation machine cycles required of other processor caches in a multiprocessor system.

It is another object of the present invention to provide a synonym detection and accessing mechanism to support an increase in cache size without requiring an increase in the cache directory set associativity.

It is still another object of this invention to determine when system performance can be increased by accessing a detected synonym or by generating a true cache miss for line fetching a detected synonym.

It is a further object of this invention to detect the shareability state of a detected synonym line entry in a cache directory to determine if the synonym entry should be accessed in the cache or if a line fetch in main storage should be obtained to copy the requested line into the principle directory class determined by the request address to thereafter permit principle location access to the line.

It is another object of the present invention to provide a synonym accessing mechanism for a store-in-cache which permits the accessing of any existing cache synonym without any line fetch, when the line is prohibited from being copied into the principle location during a checkpoint interval.

It is still another object of this invention to use synonym detection to avoid a readonly synonym in the cache by copying the readonly line of data into the principle location in the cache in response to a processor store or fetch request.

It is a further object of this invention to use synonym detection to enable a readonly synonym line to be duplicated in the principle location in the cache when the readonly synonym is found in response to a processor fetch request.

It is another object of this invention to use synonym detection to invalidate a readonly synonym and cause the line to be copied into the principle location in the cache when the readonly synonym is found in response to a processor store request.

The invention detects and handles synonyms for a store-in-cache (SIC). A cache directory in the CPU is searched in the principle class addressed by a subset of bits taken from the processor request's logical address. The class address has both translatable and nontranslatable bits. If the principle class contains the request's translated address, the data is accessed in a corresponding location in the cache. If the principle class does not have the request's translated address, a cache miss command is generated which sends a line fetch command to fetch a required line. The cache miss command also causes synonym search and alter circuits to generate the address of every potential synonym class by permutating the virtual bits in the principle class address received in the miss command, and the entries in each potential synonym class in a copy directory (CD) are compared to the translated request address in order to detect for any existing synonym.

Each entry in the cache directory and its CD also has an exclusive (EX) shareability control flag bit which controls the handling of a request after detection of a synonym in the CD. The controls for the EX bit are described and claimed in previously cited U.S. patent application Ser. No. 295,500, filed Nov. 10, 1980.

If the EX bit is on in the cache directory entry, the line is locked in the cache for a checkpoint interval and the data is accessed in the detected synonym location in the SIC. (Checkpointing is described in U.S. Pat. No. 3,736,566). If the EX bit is off representing readonly state, the line is not locked during the checkpoint interval, and the data is not accessed in the detected synonym location. Instead, the RO line is copied from the synonym location into the principle location (i.e. addressed by the current logical address) to improve system performance.

BRIEF DESCRIPTION OF THE DRAWING

FIG. 1 is a block diagram of a multiprocessing system utilizing the subject invention.

FIGS. 2A and 2B illustrate the tag bits found respectively in the processor directories and copy directories for each line represented therein.

FIGS. 3A, 3B, 3C and 3D illustrate the types of information found in various commands used in the described embodiment of the invention.

FIGS. 4A, 4B, 4C, 4D, 4E, 4F, 4G, 4H, 4J, 4K, 4L, 4M, 4N, 4P, 4Q, 4R, 4S, 4T, 4U, 4V, 4W and 4X represent timing diagrams showing the sequencing of operations in the described embodiment.

FIGS. 6, 7, 8A, 8B, 8C and 9 illustrate the pertinent controls found in each system controller (SC) shown in FIG. 1.

FIG. 10 illustrates in detail the copy directory (CD) addressing circuits shown as a block in FIG. 8C. FIG. 11 shows in detail the synonym search alter circuits represented as a block in FIG. 8C.

FIG. 12 shows in detail the synonym capture circuits represented as a block in FIG. 8C.

FIG. 13 illustrates in detail the BCE response controls shown in a block in FIG. 5.

BACKGROUND SYSTEM CONTAINING THE PREFERRED EMBODIMENT

Figures 4T, 4U, 4V:
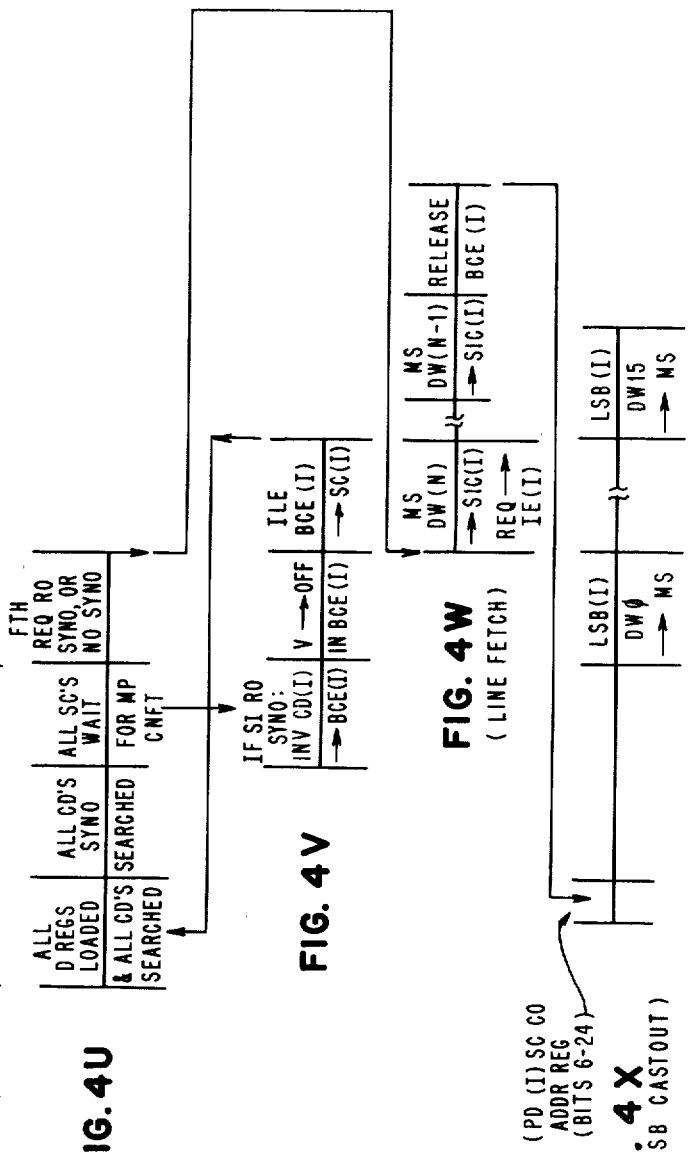

FIG. 1 represents a background multiprocessing (MP) system containing the described embodiment of the invention. The MP illustrated in FIG. 1 comprises four central processors CP0 through CP3, in which each CP includes an instruction execution (IE) unit and a buffer control unit (BCE). Each IE includes the hardware and microcode which issue instructions which require the fetching and storing of operands in main storage (MS). The IE begins a fetching or storing operation by issuing a fetch or store command to its cache controls (BCE), which includes a processor store-in-cache (SIC) with its associated processor cache directory (PD) and all processor cache controls which are exclusively used by the associated CP. The CP generally issues a fetch or store command for each doubleword (DW) unit required by an operand. If the DW is in the PD (as in the case with most processor fetch and store commands), the DW is fetched or stored in the cache in accordance with the command, and the command is completed without any need to go outside of the BCE. Occasionally the required DW is not in the cache, which results in a cache miss. Before the IE fetch or store command can be completed, the DW must be fetched from MS. To do this, the BCE generates a corresponding fetch or store miss command which requests an associated system controller (SC) to obtain from MS a line unit of data having the DW required by the IE. The line unit will be located in MS on a line boundary, but the required DW will be the first DW in the fetched line to be returned to the requesting BCE.

In the MP in FIG. 1, two system controllers SC0 and SC1 are each connected to two CPs and to the shared main storage (MS), so that either connected processor can access any shared area in main storage. Each SC also connects I/O to the shared main storage. Each SC may include the subject matter disclosed in U.S. Pat. Nos. 4,280,176, issued July 21, 1981 by K. G. Tan entitled "Memory Configuration, Address Interleaving, Relocation and Access Control System" and 4,293,910, issued Oct. 6, 1981 by F. O. Flusche et al entitled "Reconfigurable Key-In-Storage Means For Protecting Interleaved Main Storage", both assigned to the same assignee as the subject invention.

The shared main storage comprises of a plurality of BSM controllers BSC0 through BSC3 in which each BSC connects to two BSMs 0 and 1. The four BSCs 0-3 are each connected to each SC.

A cross-interrogate (XI) bus connects from each SC to the other SC. The XI bus communicates all cross-interrogation (XI) requests and all castout (CO) and invalidate (INV) signals between the SCs to synchronize and coordinate the required castouts, MS fetches, and invalidations in the directories.

Each SC contains a pair of copy directories. Each copy directory (CD) contains an image of the contents of a corresponding processor cache directory (PD) in one of the BCEs connected to the respective SC. Both PD and CD are addressed by the same bit positions from the logical address.

The copy directories handle all cross-interrogation (XI) requests, so that the processor cache directories in the various BCEs will not need to handle the XI interrogation requests and can thereby better service their respective CPs. The XI bus connects all SCs and synchronizes all CD searches for conflicts so that XI searching is avoided in the PDs.

Each of the other CPs 1-3 has an IE identical to the IE0. Each IE unit is basically similar to IE units found in conventional microprogrammed processors.

A doubleword wide bidirectional bus is provided between each BSM in main storage (MS) and each SC port, and from each SC to each associated central processor (CPU) and I/O channel controller (EXDC) processor. Both commands and data may be sent on any bus. When a CPU cannot find a requested doubleword (DW) in its cache, its buffer control element (BCE), which controls the CPU cache, initiates a line access request to MS by sending a miss command to its associated system controller (SC), which then reissues the command to a required BSM in main storage. In the event of a BSM busy condition, the SC will save the request in a command queue and will reissue it at a later time when the required BSM becomes available. The SC also sequences the MS commands in an orderly fashion, so that all commands to a particular BSM are issued in first-in/first-out (FIFO) order, except when a cache conflict is found. Prior to issuing a MS line command, a real address to physical address transformation is performed by the SC to determine the BSM location of the real address. See U.S. Pat. No. 4,280,176 previously cited herein. At the same time, the request is sent to the storage key array to check for a possible access storage protection violation, as well as to the copy directories in all SCs to search for a possible data contention conflict. Thus, during the normal sequence of handling a MS request, the SC is constantly monitoring the status of main storage, is analyzing the interrogation results of the storage protect key and all cache directories, is examining the updated status of all pending commands currently being held in the SC, and is also looking for any new BCE commands that may be waiting in the BCE to be received by the SC.

The main storage protect key arrays are located in the system controller as described and claimed in U.S. Pat. No. 4,293,910 to F. O. Flusche et al, assigned to the same assignee as the subject application. It performs all key operations defined by the IBM System/370 architecture. Normally, the storage key is checked in parallel with the issuance of the request to memory and this check does not interfere with actual main storage access time.

Due to the store-in-cache (SIC) design of each CP cache, CP changed data resides in the CP SIC and is not available in MS until the data is castout of the SIC by the cache line replacement mechanism whenever cache line space is required for newly requested lines. Each SIC has a processor cache directory (PD) which controls its SIC operations.

GENERAL DESCRIPTION OF THE PREFERRED EMBODIMENT

Because of the nature of a CP store-in-cache (SIC), each CP's updated lines in its SIC are not stored in MS immediately. Thus, many lines of shareable, unchanged and changed data may be scattered among the SICs. Unchanged SIC lines are available in MS, but changed lines are only available in the SIC in which they reside. Each SIC line is given a shareability designation, which is used by the MP cache management controls to apply appropriate control over the type of shareability of each line while in one or more SICs in the MP. In general, any IE requests instructions with the parallel shareability designation of readonly, because instructions are not expected to be changed. However, operand data are generally requested by the IE with the serial shareability designation of exclusive, because they are to be changed, or are likely to be changed. The IE shareability designation is provided in FIG. 5 on line 24, on which an up signal state indicates an exclusive (EX) designation for the current IE request, while a down signal state indicates a read-only (RO) designation for the current IE request to the BCE in the CP.

Although a CP request may be for a doubleword (DW), unit for the CP, it is accessed from a line unit of operand data and/or instructions in its cache. Main storage accessing efficiency is greatly improved by having line units for plural DWs (e.g. 16 DWs) accessed as a unit in MS for each cache, and each cache directory is organized to manage its content on a line basis. Therefore, the shareability designation in the cache is done on a line unit and not on a DW unit basis.

The line shareability designation is checked for each CP DW unit access in the cache and any IE store request causes a cache miss when the shareability designation for the accessed line is RO; but any IE fetch request is immediately accessed. If the line designation is EX, both IE fetch and IE store requests are immediately accessed into the line in the cache.

Therefore, when any IE initiates an operand or instruction fetch request, the IE issues a fetch command such as shown in FIG. 3A for a doubleword (DW) of data or instructions to its BCE with one of the following two types of sharing control designations:

Readonly (RO): The DWs in the line in the cache may immediately be fetched. All CPs can simultaneously access the line in their processor SICs as long as they need only fetch the data in the line. Any CP store request for a DW in a line designated RO causes a cache miss which changes the designation to EX and forces any other CP sharing the line RO to invalidate its copy of the line.

Exclusive (EX): The DWs in the line may be fetched or stored into by the CP possessing the line exclusively. No other CP can access the line. If another CP must access the line, the CP possessing the line must give up the line to the CP requesting the line which then becomes the only CP possessing the line. If the possessing CP has stored into the line (i.e. changed it) the possessing CP has the latest version of the line; and the line version in MS is not the latest version and should not be accessed. Therefore, the possessing CP must castout a changed line to MS to provide the latest version in MS whenever another CP is to obtain the line, whether or not the possessing CP will continue to possess the line with a readonly designation.

The described embodiment uses the directory line shareability designations in the way it handles cache synonyms.

Therefore, the current line shareability designations in each SIC in the MP are contained in the processor directory (PD) associated with each SIC in the MP. The BCE containing each PD enforces the rules pertaining to the shareability designations in the PD, and generates a cache miss for the current IE request whenever the requested PD class does not contain an entry with the translated request address. A request in a synonym entry will cause a cache miss. Inter-CP communication is required for servicing each cache miss.

The implementation of these shareability rules is complicated by having copy directories (CDs) control the inter-CP communication of CP requests, but the CDs are needed to reduce interference with normal SIC operation due to inter-CP communications.

The nomenclature used herein distinguishes the issuing CP (which may be any CP0–CP3 in the MP issuing a storage request command being XIed) from each of the remote CPs (which is the remaining CPs of CP0-CP3 that did not issue the command for which they are being XIed). The issuing CP and all of its associated cache entities (i.e. its IE, BCE, PD, SIC and CD) are identified with the suffix (I), i.e. IE(I), BCE(I), PD(I), SIC(I) and CD(I). Every remote CP and all of its cache entities are identified with the suffix (R), i.e. IE(R), BCE(R), PD(R), SIC(R) and CD(R).

A cache miss signal occurs if a CP(I) requested DW is not identified in its PD(I), i.e. not in PD(I) or in a synonym entry in PD(I), or is identified with a RO designation when the CP(I) is requesting a storage write access. In response to any cache miss signal the CP(I) cache controls in its BCE(I) request a fetch of the line containing the requested data, and a cross-interrogation (XI) of its directory CD(I) to check for synonyms and of all other directories CD(R) in the MP to check for conflicts to assure that the requesting SIC(I) will receive the latest version of that line, and invalidate an exclusively obtained line when it is held in any SIC(R). The XI operation searches the copy directories CD's of all CP's to determine if any CP cache has the line (i.e. a cache conflict).

Virtual address bits from the IE logical address are used to address the cache directories; and they only address the principle cache class and they do not address any synonym class in PD or CD. Then each potential synonym class must be searched for the absolute address translated from the CP request in order to detect the existence of any synonym line.

Cross-interrogation and synonym searching are not done in the PD's, so that no PD cycles are stolen for XI or synonym detection purposes, and therefore the XI and synonym detection burden is placed on the CD's. Synonym searching is done in CD(I), and conflict searching is done in each CD(R). Any PD(R) is only accessed after a conflict is detected in its CD(R) and PD(R) must be changed. PD(I) is accessed only for a synonym found in CD(I) to be exclusively designated, and a readonly synonym is not accessed but its line is fetched into its principle class, which is then accessed. Most XI and synonym searches will not cause any change in the associated PD(R), since only a small percentage of XIs will find any conflict or synonym (e.g. less than 5%).

Thus, if cross-interrogation for a CP fetch request finds the line in another CD(R) (i.e. a line conflict), its shareability designation is checked in the remote CD(R). If an RO designation is found, no further action is required for the other CD(R). But if an EX designation is found for the conflicting line, the SC controls for that conflicting CD(R) must generate an ARO (alter to readonly) command to its corresponding PD(R). Then the BCE(R) with the corresponding PD(R) tests the state of a line change (CH) tag bit in combination with the EX state to determine the final designation for the conflicting line subject to the fetch request. If the CH bit indicates no change, PD(R) changes the EX bit to RO state and issues a CERO (change entry to readonly) command to its associated CD(R) to do likewise. But, if the CH bit indicates the line was changed, the BCE sets the V (valid) bit to invalidate state in the PD(R), initiates a castout (CO) of the line from the associated SIC, and issues a castout (CO) command to the SC which causes the conflicting entry in the corresponding CD(R) to have the V bit set to invalidate state.

A CP(I) store interrogate (SI) command initiated the XI. If a conflicting line is found in any CD(R), the SC having the conflicting CD(R) issues an invalidate (INV) command to its associated PD(R) to invalidate the conflicting line when a readonly conflict is detected. If an exclusive conflict is detected, a CD command is issued which causes the PD(R) to test its CH bit, and to issue an ILE command to the CD(R) if the line is held RO or EX and was not changed, but to issue a CO command to the CD(R) if the line is held exclusive and was changed.

If an I/O channel or service processor (SVP) initiated a fetch or store request to main storage, each CD(R) must be cross-interrogated for the address of the request to determine if its SIC has conflicting data. If a conflict is found in a CD(R) holding the data exclusively or holding it RO when there is an I/O or SVP store or fetch request, the CD(R) communicates with its PD(R) and the line is invalidated if unchanged, or castout and invalidated if changed.

All possible request type, initial and final line shareability designations, pertinent commands between each associated CD and PD pair for a CPU having a conflicting line, and the effect of the CH bit in the PD are summarized in the following Table 1:

TABLE 1

| ISSUING CP(I) (With Cache Miss) | | | | CP(R) (With Conflict) | | | |
|---|---|---|---|---|---|---|---|
| | | | | SC | BCE(R) CMD to SC(R) | | CD(R) |
| Request Type | New Line Desig. | Old Line Desig. initial | Final | CMD to BCE | data changed (CH ON) | data unchanged (CH OFF) | to CD(I) SIG |
| CP Read Only (RO) Fetch | RO RO RO | RO EX EX | RO INVAL RO | — ARO ARO | — CO — | — — CERO | — — — |
| CP Exclusive (EX) Fetch | RO EX RO | RO EX EX | RO INVAL RO | — ARO ARO | — CO — | — — CERO | ATRO — ATRO |
| CP Store Interrogate (SI) | EX EX EX | RO EX EX | INVAL INVAL INVAL | INV CO CO | — CO — | ILE — ILE | |
| I/O or SVP Fetch I/O or | | RO EX EX RO | RO INVAL INVAL INVAL | — CO CO INV | — CO — — | — — ILE ILE | |

TABLE 1-continued

| ISSUING CP(I) (With Cache Miss) | | CP(R) (With Conflict) | | | | |
|---|---|---|---|---|---|---|
| Request Type | New Line Desig. | Old Line Desig. initial | Old Line Desig. Final | SC CMD to BCE | BCE(R) data changed (CH ON) | CMD to SC(R) data unchanged (CH OFF) | CD(R) to CD(I) SIG |
| SVP | | EX | INVAL | CO | CO | — | |
| Store | | EX | INVAL | CO | — | ILE | |

Invalidate Line Entry (ILE): BCE(R) sends an ILE command to the CD(R) controls to invalidate the specified directory line entry in the CD(R).
Cast Out (CO): BCE(R) transfers the line having the request address from SIC(R) to MS through a line store buffer (LSB) in BCE(R), which causes the CD(R) entry to be invalidated upon the successful completion of the store operation.
Alter to Readonly (ARO): SC command asking BCE(R) to test the CH bit in PD(R) and make an appropriate command to CD(R), i.e. a CERO or CO command.
Change Entry to Readonly (CERO): BCE(R) command asking SC(R) to change the EX bit in CD(R) to its RO state.
Alter to Readonly (ATRO): SC control signal from CD(R) to CD(I) to alter EX bit in issuing PD(I) to RO state.

To assure the integrity of the XI operation, all copy directories in the MP are searched simultaneously. Therefore all CDs in the MP are examined for a line address which matches the line address in each CPU miss request in the MP. Each CD search operation also detects the presence of any match in all synonym classes for the requested line in every CD. If no CD match is found during the search operation, the line fetch request due to the cache miss is immediately accessed in MS. If a match is detected for an exclusive synonym in CD(I), the line fetch request is cancelled and the IE access is made in the synonym location in SIC(I). If a match is detected for either the request address (i.e. in the principle class), or a synonym class in CD(R), a conflict signal is provided to CD(I), and any required castout(s) are made from SIC(I) and/or SIC(R) to MS before the line fetch is made to SIC(I). A detected readonly synonym in CD(I) is also handled like a conflict in that a line fetch is then made in MS. Any line fetch request with a CD detected conflict is held in an SC command queue, from which the line fetch request is reissued to MS after any castout line is completely removed from the cache into a line store buffer. The command queues and their SC controls are described and claimed in U.S. Pat. No. 4,136,386 filed Oct. 6, 1977 by E. J. Annunziata owned by the same assignee as the subject application.

The SC connects between MS and the BCEs and the I/O channels by using 72 line bidirectional busses (64 data/command lines plus 8 ECC lines) to provide a doubleword parallel transfer for both the commands are transmitted.

The different synonym and non-synonym detection conditions in CD(I) for a BC(I) miss command are represented in the following Table 2, in which the acronym meanings are in parenthesis: CMD (Command), LF (Line Fetch), Syno (Synonym), Desig (Designation), # (Number of Copies of the Requested Line), Inval (Invalidation), OP (Operations), CP Acc (Processor Accesses), Princ (Principle), and FTH (fetch request state of the SI bit):

TABLE 2

| BCE Miss CMD (For LF) EX | Initial CD(I) Syno SI | | Resulting Action for CP(I) | | | |
|---|---|---|---|---|---|---|
| | | Desig. | # in SIC(I) | Syno Inval. in SIC(I) | OP | CP(I) Acc. |
| RO | FTH | RO | 2 RO | No | MS LF to SIC(I) | Princ. |
| RO | FTH | EX | 1 EX | No | Syno Addr | Syno |
| EX | FTH | RO | 2 RO | No | MS LF to SIC(I) | Princ. |
| EX | FTH | EX | 1 EX | No | Syno Addr from CD(I) to PD(I) & no LF | Syno |
| EX | SI | RO | 1 EX | Yes | MS LF to SIC(I) | Princ. |
| EX | SI | EX | 1 EX | No | Syno Addr from CD(I) to PD(I) & no LF | Syno |
| RO | FTH | No Syno | 1 RO | No Syno | MS LF to SIC(I) | Princ |
| EX | FTH | No Syno | 1 EX | No Syno | MS LF to SIC(I) | Princ |
| EX | SI | No Syno | 1 EX | No | MS LF to SIC(I) | Princ. |

A BCE(I) miss command for a line fetch causes SC(I) to search CD(I) for synonyms at the same time and in the same CD classes that each CD(R) is searching for conflicts in its principle and synonym locations for the same BCE(I) miss command. The BCE(I) miss command bit positions EX and SI shown in FIG. 3B exercise control over how SC(I) handles any synonym which might be found in CD(I), as well as the setting of the EX bit in a found synonym entry in CD(I). The output compare circuits for CD(I) detect the existence of any synonym in CD(I). An exclusively designated synonym entry is detected by an EX compare (CMPR) signal, and a readonly designated synonym entry is detected by a RO compare signal.

When any central processor fetch or store (SI) request detects an EX synonym in CD(I), the synonym class entry is determined by SC(I) and its address is transmitted to PD(I) to enable the processor to access the requested data in the synonym location in SIC(i).

But when any processor fetch or store request finds a RO synonym entry, the request does not access the RO synonym line in SIC(I), but instead accesses a new entry put into the principle class in PD(I) and CD(I) for a line fetch into the principle class in SIC(I). Then the processor thereafter accesses the data in the principle class.

Although an RO synonym line is not accessed by an RO fetch request; nevertheless the RO synonym is left valid in SIC(I) with the result that two copies of the line then exist in SIC(I).

Also, an RO synonym is not accessed by a SI (store) request; but since SI requests are always exclusive, duplicate entries are not permitted. That is, only one EX entry can be provided for a given line in all caches in the MP at any one time. Therefore, the line fetch is made to a location in the principle class where its entry is set to exclusive state, and the RO synonym entry is invalidated.

Hence the result of an RO fetch request is that it ignores an RO synonym and causes the synonym line to be effectively copied into the principle location in SIC(I). Thereafter, subsequent IE requests to the principle address will find the data in the principle cache location and not generate any cache miss, thereby avoiding cache misses and their line fetch and the cross-interrogation overhead which would significantly increase access time for subsequent requests to the same line. On the average, this overhead saved for subsequent accesses to the same line outweighs the initial line fetch and potential replacement overhead involved in copying the line into the principle location.

After the copy of the RO synonym line is put into the principle location in SIC(I) as a result of an IE fetch request, the RO synonym entry in CD(I), PD(I), SIC(I) remains valid and useable; and therefore the new primary location duplicates a line in the cache, and both must be set to an RO designation. The reason why this RO synonym line is not invalidated is that there is no purpose for invalidating it at this time, since it is possible for some other program to get dispatched on CP(I) for which the synonym location may be the principle location. For example, one program may detect a cache location as a synonym, while another program may detect the same location as a principle location, since the principle/synonym relationship is always relative to the requesting address, and they occur for both IE fetch and store interrogate requests.

When a SI request finds a RO synonym, it must either change the RO synonym designation to EX, or move the line as an EX entry into one of the four set locations in the principle class, since a SI request can only store into an exclusive line in SIC(I), which can not be duplicated anywhere else in this cache or any other cache. The principle entry choice is preferred with invalidation of the RO synonym, since subsequent accesses to the same line will likely occur, thereby saving the overhead of cache misses for the reasons previously discussed. Changing an RO designation to EX for any entry would also involve the XI overhead of checking all other caches and invalidating any other corresponding RO entry that might be found.

Approximately 95% of the IE fetch and store requests are fully satisifed by accessing the SIC, because the data required by the command is already available in the the SIC. For the remaining small percentage of the requests which miss in the cache, the request cannot be satisfied until either CD(I) reports the cache address of an exclusive synonym to PD(I), or no exclusive synonym is found in CD(I) and the line of data containing the request doubleword address is fetched from MS into the SIC of the requesting processor. Before a line fetch can be made, some important housekeeping functions must be performed. The first is to assure that there is room in the requesting SIC for the requested line. If there is no room, then the least-recently used (LRU) algorithm circuit must specify which one of four set locations in the addressed directory class is to receive the line address to be fetched, and if any changed data exists in a currently valid line address in that location, that line must be castout to a line store buffer (LSB) to make space in the SIC before the new line can be loaded into the SIC. Also, before the new line can be fetched from main storage, there must be assurance that main storage has the most recently updated version of the new line. This update test is made by cross-interrogating (XI) all CD(R)s in the MP to determine that no other SIC has a changed version of the line. An updated line possibility is indicated when any CD(R) is found to have a conflicting line; and an updated line is confirmed if a change (CH) bit in the associated processor directory PD(R) is in a set state.

An IE command to the BCE (FIG. 3A) contains the logical address (i.e. virtual or real address) for a DW of instruction or operand data. In the BCE circuits of FIG. 5, an activated SI request bit or fetch request bit in the IE command inputs to a BCE priority circuit 37 to formalize the IE request to the BCE(I). An output of circuit 37 indicates when the BCE(I) accepts the IE command.

Figure 5:
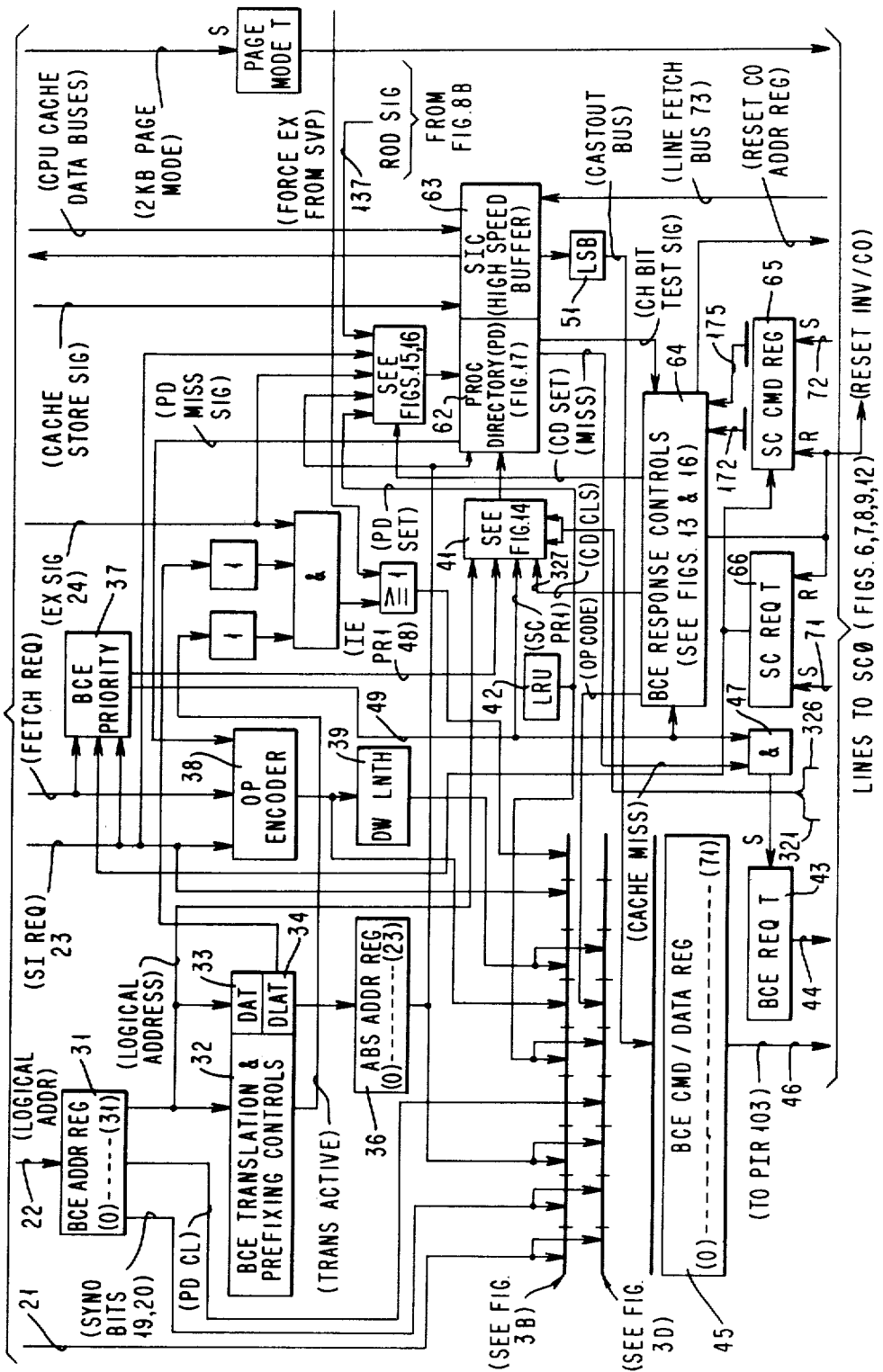
FIG. 5 illustrates the pertinent processor buffer control element (BCE) found in each central processor (CPU) shown in FIG. 1.

In the BCE controls shown in FIG. 5, the logical address is received from the IE command by a BCE address register 31 and is provided to conventional translation and prefixing controls 32, which provide the absolute address, which most of the time may be immediately obtained from a DLAT (dynamic look-aside address translation) array 34. If not in the DLAT, then DAT (dynamic address translation) hardware 33 is invoked to translate the address and place the translation in an entry in DLAT 34. The translated absolute address of the request is put into an absolute address register 36.

Figure 17:
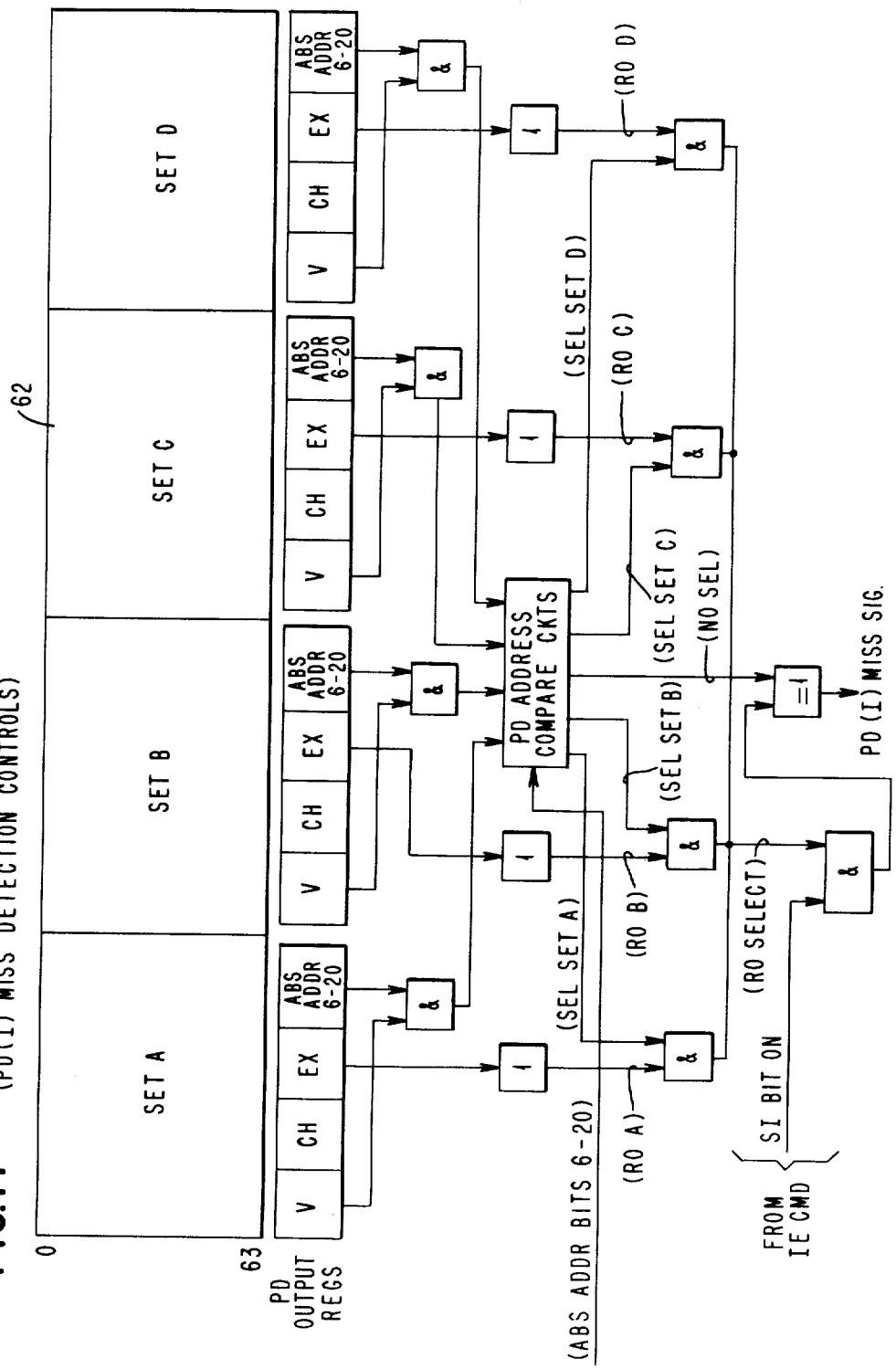
FIG. 17 shows cache miss detection circuits which are provided at the output of the processor directory shown in FIG. 5.

Simultaneously with the DLAT operation, the BCE address register 31 outputs six bit positions 19–24 of the logical address as a class address to PD class addressing controls 41 to select a PD class entry in PD 62 containing four set-associative line entries. The choice of bits 19–24 selects one of 64 classes in the cache. The output of absolute address register 36 is then provided to conventional set-associative comparators in PD 62 to select any line entry in the selected class that matches the absolute address. FIG. 17 shows this comparator circuitry in detail. If no match is obtained, a no select output is activated which provides a cache miss signal. If a match is obtained, data exists in SIC 63 at a line location associated with the matched entry in PD, and the requested DW is accessed in this line.

If a cache miss occurs, it activates an LRU circuit 42 to choose the least recently used entry (i.e. set A, B, C or D) in the same PD class for receiving the tags for the line to be fetched from MS. If the valid bit is off in the selected line entry, or if the valid bit is on and the CH bit is off in this entry, it is immediately available for the new line. If the valid bit is on and the CH bit is on, then an updated line currently resides in this entry and it must be castout before the new line can be received by the SIC 63.

Whenever a cache miss occurs, a BCE miss command is generated in the BCE and sent to the SC in order to make a line fetch request to MS, and to initiate the XI operations. The miss command is shown in FIG. 3B and is formed in BCE command/data register 45 which receives the absolute address of the requested data from register 31. The BCE command also receives the PD set field from LRU 42, an OP code field from OP encoder 8 which encodes the fetch or store interrogate bit in the IE command, a length field from a DW length circuit 39 which indicates the number of doublewords in a line to be fetched or stored, a SI bit field which indicates whether or not the miss command is a result of a store or fetch command from the IE, and an EX signal field which indicates whether or not the IE requested the data exclusively or readonly. The processor ID field is not transmitted by the BCE but is inserted by the SC when it receives the command, in order for the XI operation to identify the processor from which the command was received, since the XI operations use commands from a number of different processors including one or more CPs, an I/O processor and a service processor.

A BCE request trigger 43 is set by an AND circuit 47 which receives a signal from the BCE priority circuit 37 after it accepts the IE command and a miss occurs.

A PIR priority circuit 101 in the SC (see FIG. 6) determines when the SC accepts a BCE command, and gates it into PIR 103 in the SC. A processor identifier (PID) encoder circuit 102 encodes the PID of the processor which had its command accepted by circuit 101, and inserts the PID into the command in PIR 103. An XIR register 104 receives the command from PIR 103 during the next machine cycle.

An XIR priority circuit 110 determines when the command in XIR 104 will be gated into a directory register 121 via a gate 122, from which the command signals initiate an XI operation by being provided to FIG. 7 representing the controls in one SC containing CD0 and CD2. If another SC exists having CD1 and CD3, it will simultaneously receive these signals from XIR 104 on the XI bus 19 in FIG. 1. This initiates a simultaneous search of all copy directories in all SCs (whether the MP has only a single SC or plural SCs). The XI search sync lines 111 in bus 19 in FIG. 6 connect between plural SCs to synchronize all CD searches in the same machine cycles. The search is for the absolute address of the line currently in each director register 121.

Whenever activated, an output of circuit 110 sets a local SC busy trigger 112. If any CD finds the searched address, it generates a conflict signal on line 130 for CD0 in FIG. 8B (or a corresponding line 130 for any other CD). FIGS. 8A, 8B and 8C show SC circuits for generating the CD0 conflict signal 130 from a CD0 conflict trigger 137.

Normally, a conflict can only be found in a remote CD(R). CD(I) finds a conflict when a readonly match is detected in a synonym class.

Although each CD has an entry for every line found in its corresponding PD, the CD need not have all of the information found in its corresponding PD. This embodiment only requires that each CD have the tag information shown in FIG. 2B which includes the valid (V) and exclusive (EX) bits and high-order absolute address bits 8–20 for each represented line. The tag entries found in each PD line entry are shown in FIG. 2A. Each PD line entry additionally contains a protect key, a fetch (F) protect bit, a line change (LN CH) bit and a page change (PG CH) bit. An additional tag bit in the PD is the LN CH bit, which hereafter is referred to as the CH bit which indicates whether or not the corresponding line is changed in the associated SIC.

The manner in which the CD is updated is controlled by the circuits shown in FIG. 8A, which controls the inputs to the CD input register in FIG. 8C that inserts or modifies the entries into the CD array.

In general, each IE sends fetch and store requests to its associated BCE. Store (SI) requests are always requested exclusively. Instruction fetch requests are requested readonly. Operand fetch requests are requested exclusively. Under special circumstances, the EX tag bit for a required line is set to RO state in spite of an exclusive operand fetch request by the IE. If an operand fetch is requested exclusively by IE(I), and PD(I) finds the EX bit is off (indicating the conflicting line is held readonly), then the access is permitted in SIC(I), and no cache miss results and no XI operation occurs for the fetch request.

If an IE(I) operand fetch request does not find the address in the principle class in PD(I), a cache miss results and an XI operation is caused in all CD. Whenever a CD finds a conflicting address for a XIed fetch exclusive request command, the SC for that CD must examine its EX tag bit state. If the EX bit for the conflicting line is set to RO state, CD will cause an ATRO (alter to readonly) signal to be transmitted to the SC for CD(I) so that it will communicate with PD(I) to change the EX bit state to readonly, since that EX bit was initially set to EX state by the IE request. But if CD(R) finds its EX bit set to EX state, for the XIed fetch exclusive request command, the SC for CD(R) will transmit an ARO command (as shown in FIG. 3C) to PD(R). The SC command includes the class and set addresses in CD(R) indicating where the conflicting entry was found, and the command contains a castout (CO) command bit, an invalidate (INV) bit, and an alter-to-readonly (ARO) bit the respective line in PD(R). The ARO bit is set to make it an ARO command. However, if CD(I) finds the EX bit set to EX state for a conflict address, CD(I) sends an EX synonym signal to PD(I) to access the synonym location in SIC(I), as shown in FIGS. 8A, 9, 12 and 14.

The different types of SC commands (if any) generated for the different situations are indicated in Table 1 herein and depend on the IE request type, the issuing PID, and the setting of the EX bit for any conflicting entry found in a CD(R).

When the SC command is received by BCE(R), the command response provided by BCE(R) is shown in FIG. 3D, and is determined as indicated in Table 1 herein which shows how the BCE command is dependent on the state of the change (CH) tag bit for the line in PD(R). In regard to this invention, the specific command response is dependent upon the command request type, its PID and EX bit state.

If a conflict is found in any CD, the BCE(I) miss command execution is suspended and this command is held in the SC command queue (not shown), until BCE(R) responds to the CD(R) command requesting ILE, CO or CERO.

If BCE(R) receives an ARO command and the CH bit is on in PD(R) for the conflicting line, a castout is required from SIC(R), and the castout begins as soon as PD(R) accepts an SC ARO command and finds the CH bit is on for the conflicting line. The BCE responds with a castout (CO) command to the SC which sets the V bit off for the entry in CD(R). If CH is off, the line is unchanged and BCE(R) will reset its EX bit to RO state and issue a CERO (change entry to readonly) command to the corresponding CD(R), in order for the CD(R) to set its corresponding EX bit to RO state for the line. The CERO command will cause the BCE(I) miss command to be taken from the SC command queue and again XI searched.

In response to the CERO command, CD(R) changes its EX bit to RO state. Then the next iteration of the BCE(E) miss command processing will find a RO state in the CD(R) entry, which will cause an ATRO signal to the SC for CD(I) to set the EX bit for the line to RO state. The hardware for this operation is shown in FIGS. 5, 7, 8A, 8B and 8C. Whenever the ATRO signal is received by the issuing CD(I), it generates a ROD (readonly designation) signal which it sends to its corresponding PD(I) to reset its EX bit for that line to the RO state, in order to indicate that the line will thereafter be held in RO state in the issuing processor SIC(I) as well as being in the RO state in each SIC(R) finding the conflict.

All storage commands are handled through several phases of sequencing control in the SC; and at any instant of time, several different phases of different storage commands may be processed concurrently in the SC.

The normal sequencing of BCE fetch and store commands includes the following described operations.

During the same time as the XI operation is being done, the command is also having its PSW storage key checked in the SC for possible key violations, as disclosed and claimed in prior cited patent 4,293,910.

Also the SC checks for the availability of the BSM and its controller required by the address in the command, as disclosed and claimed in prior cited U.S. Pat. No. 4,280,176. If the BSM is not busy, the MS command is sent to the BSM immediately. On the other hand, if the BSM is found to be busy and/or a conflict is found, the command is saved in the SC command queue and the queue array, to be reissued when the BSM becomes available and/or the conflict is resolved. Each time an XI operation iteration is completed, the status for the MS command is again updated in the command queue.

After the BSM controller (BSC) of the required BSM receives the MS command from the SC, the BSC may or may not start the storage access immediately (depending on whether there is a previous storage access in progress). The BSC will signal the SC when a data ready condition exists.

Because of the long memory access time relative to the CP cycle time, by the time the BSC signals data ready, the SC has normally completed all status checking related to the MS command. If directory conflicts or key violations are detected, the MS data transfer phase of the operation is cancelled, and may subsequently be reissued after the conflicting conditions are resolved. However, with most MS commands, no conflict or violation is detected; therefore, the data transfer takes place immediately after the SC has checked that both MS and CPU data transfer paths are not busy.

From zero to three lines of main storage access occur as a result of each BCE miss command. Except for an EX synonym, the BCE miss command requires a line fetch from MS to SIC(I). A cache miss may also require a line castout from SIC(I) in the issuing processor to make room for the required line fetch if the LRU selected location is occupied by a valid changed line. If the XI operation finds the requested line was updated in any SIC(R), the line must be cast out of SIC(R) before it can be line fetched by SIC(I).

The three phases of control described above, namely, BCE command processing, MS access control, and the data transfer, are all independently handled in the SC. The control of each phase can begin processing a new command in that phase as soon as the phase has finished processing the previous command. Therefore, several different commands can be processed concurrently in the SC by its different phase controls.

FIGS. 4A through 4F illustrate timing sequences for a BCE miss request having an XI conflict with the CH bit on and requiring two line castouts from SIC(I) and SIC(R) prior to the line fetch. FIGS. 4H through 4N illustrate timing sequences for a BCE miss request requiring only a castout by the issuing processor SIC(I) prior to the line fetch.

FIG. 4A illustrates a cache miss followed by the castout of the sixteen DWs of a valid changed line in SIC(I) to its LSB(I) to make room in SIC(I) for a requested line fetch. The castout uses a line store buffer (LSB) 51 shown in FIG. 5 in order to free up SIC(I) before the castout line in LSB is stored into MS, which otherwise would delay the line fetch, so that the line may be made available to CP(I) much earlier than if its DWs were directly transferred from SIC to MS. Thus in the first cycle shown in FIG. 4A, PD(I) is searched and the miss is found at that time, the BCE miss command is sent to the SC, and LRU 42 selects the SIC location to receive the line fetch but it is currently occupied by another valid changed line. Then the occupying line is castout of SIC(I) during the succeeding sixteen cycles to respectively empty the sixteen double-words from SIC 63 into the LSB 51 (FIG. 5) with the timing shown in FIG. 4A as DW0 through DW15 are transferred from SIC(I) to LSB(I) for the initiating CP. As soon as the last DW15 of the SIC(I) to LSB(I) is completed, SIC(I) is able to receive the line fetch, which can begin if the XI operations are completed.

Figure 6:
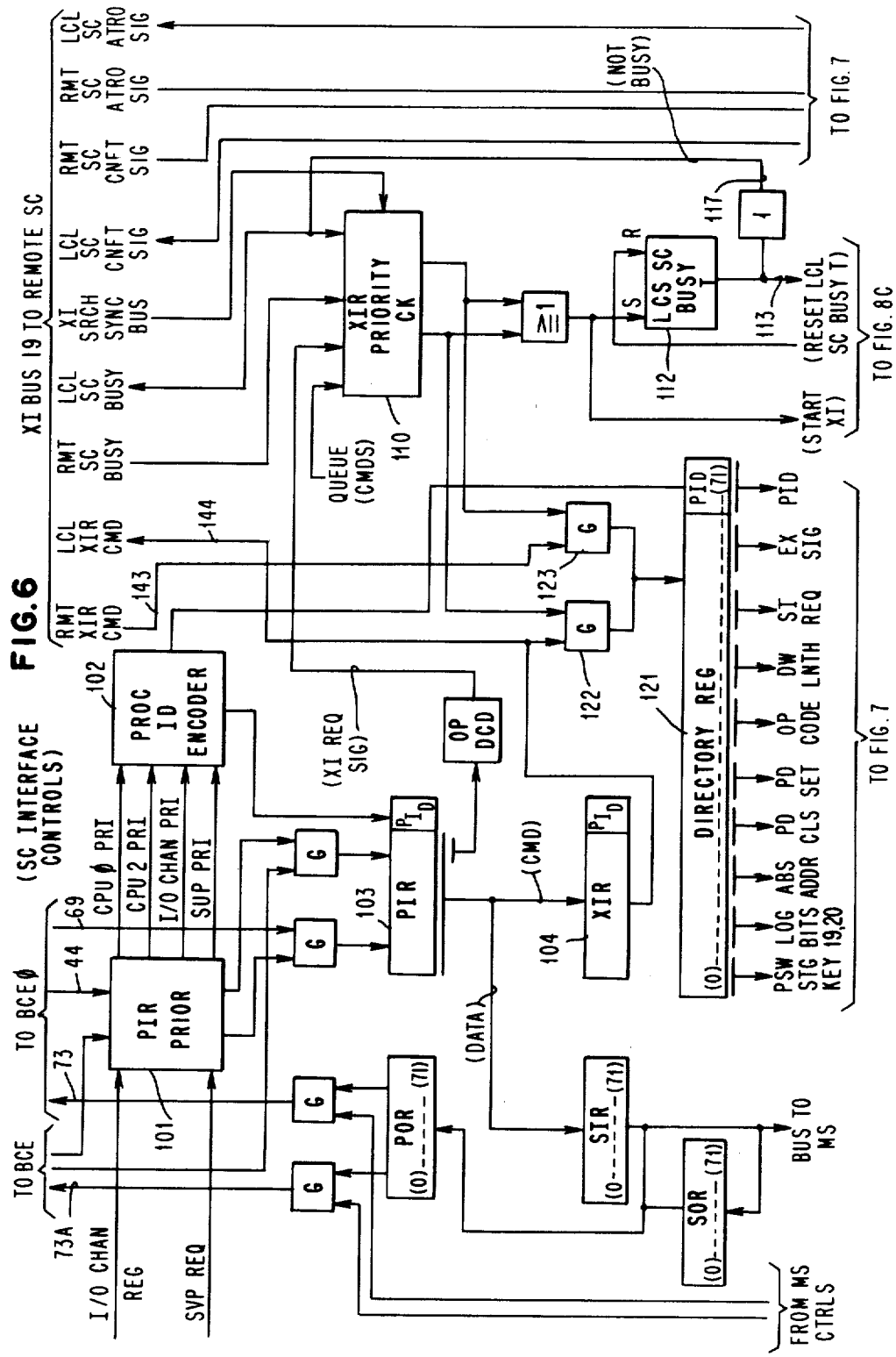

In FIG. 4B simultaneously with the SIC(I) castout, the SC receives the BCE miss command in its PIR(I) 103 (the circuits are shown in FIG. 6) two cycles after the BCE received its request from IE(I). On the next cycle, the command is received by XIR(I) 104. When XIR priority is given by circuit 110 on the following cycles, the command is transferred by gate 122 into directory register 121 in the local SC(I), and simultaneously via the XI bus to gate 123 into directory register 121 in each remote SC(R), if any.

Then in FIG. 4C during plural cycles all CDs in the MP are searched for the BCE command address in the principle class and its synonym classes, one cycle per class being searched. Then all SCs wait for a cycle during which they receive any MP conflict signal resulting from the searches. If an address conflict is found in any CD(R), and if the EX bit is on for the line, its SC sends an ARO command from register 201 in FIG. 8B to register 65 in FIG. 5 in its BCE(R), as shown by the first cycle in FIG. 4D. In the next cycle, the BCE(R) receiving the ARO command tests the change (CH) bit for the line in PD(R) being addressed by the ARO command.

Figure 16:
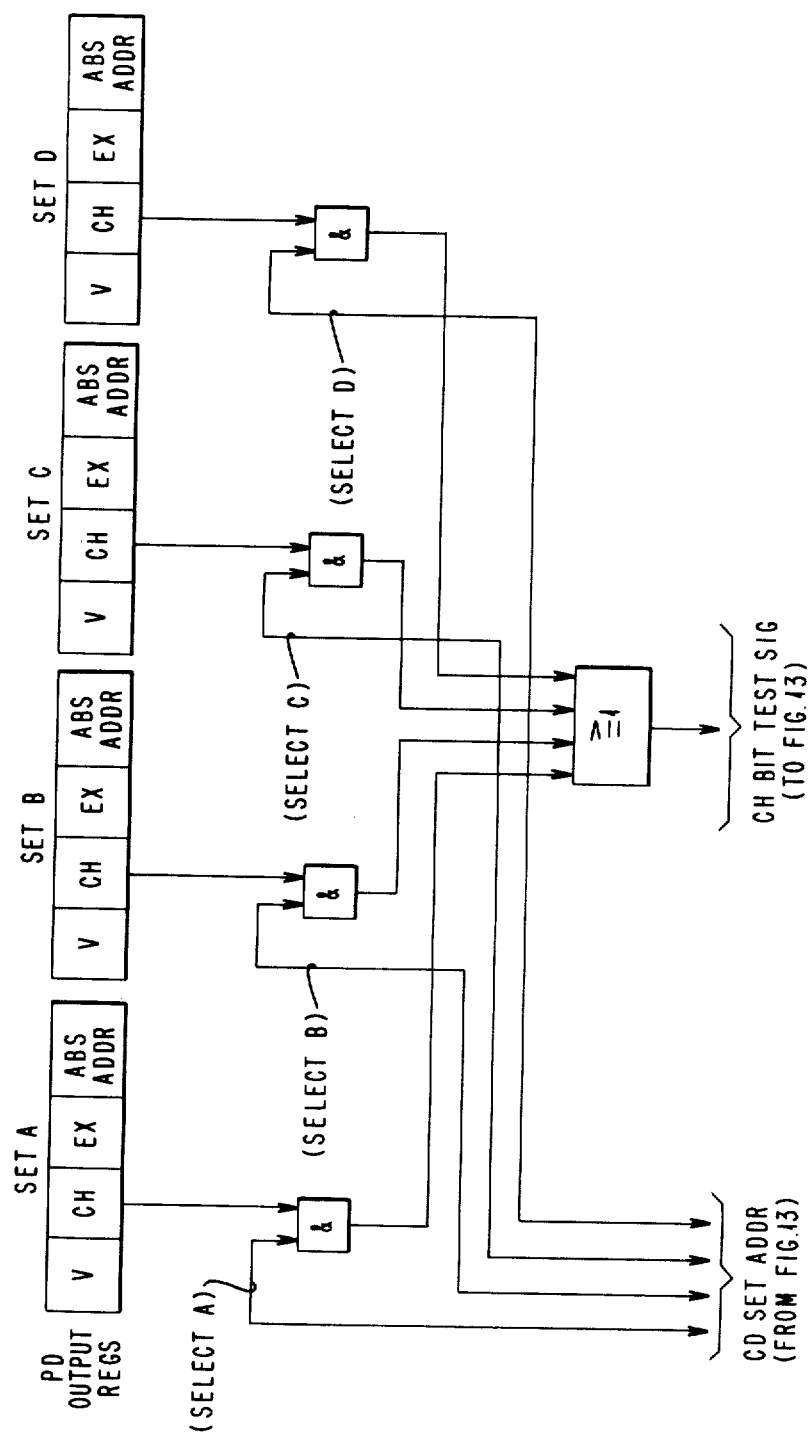
FIG. 16 shows in detail the change bit test circuit in the BCE response controls shown in a block in FIG. 5.

FIG. 16 shows a detailed circuit for testing the state of the CH bit in any selected PD output register.

During the next cycle in FIG. 4D, if the CH bit is on (indicating the line was changed), BCE(R) sends a castout (CO) command from its command register 45 in FIG. 5 to SC PIR 103.

In the third cycle in FIG. 4D, PD(R) is updated by BCE(R) invalidating the entry, and simultaneously issues a CO command to SC(R). Then the SC loads its CO register 211 in FIG. 8C, and CD(R) is updated by its SC invalidating the entry. Then during the fourth cycle in FIG. 4D the castout begins by moving DW0 of the addressed line in SIC(R) to LSB(R), etc. until all sixteen DWs of the line are received in the LSB(R), after which in FIG. 4E the LSB(R) provides the updated line to MS from which it is available for a line fetch to the requesting SIC(I) in FIG. 4G since the XI operations in FIG. 4C are most likely completed by this time. To check the completion of the XI operations, the first cycle in FIG. 4C is again entered in order to begin the sequence of operations which again searches all CDs in the MP to determine if any conflict still exists, which normally should be resolved by this time. If no conflict then exists, the line fetch begins, which is shown in FIG. 4G.

Thus, the line castout from SIC(R) to LSB(R) may overlap the line castout from SIC(I) to LSB(I) if both castouts are required. The requested line fetch from MS shown in FIG. 4G may begin as soon as the castout of the updated line is completed to MS, which is shown in FIG. 4E, i.e. LSB(R) to MS of the sixteen DWs. The line fetch begins with the requested DW(N) which is the DW at address N requested by the IE command which caused the cache miss. The line fetch of the 16DWs may wrap around to the beginning of the line before it ends with the sixteenth DW (N-1) into SIC(I).

The castout transfer from any LSB to MS is controlled by the absolute address of the line in CO address register 211 in FIG. 8C, which is received in the SC from the command currently in its directory register 121 in FIG. 6. When the line castout to MS is complete, the SC signals a CO complete status to BCE(R) which sets its CO complete trigger in FIG. 14 if all conditions indicate the CO is successful and the line is available in MS. The output of the CO complete trigger is provided to a reset input in the CO address register 211 in FIG. 8C in order to make it available for a next castout transfer operation to MS.

FIGS. 4H–4N show an example of a remote conflict having the CH bit off (indicating the line was not changed) as shown in the third cycle in FIG. 4L (corresponding to the third cycle in FIG. 4D). Then BCE(R) sends a CERO command from FIG. 5 to FIG. 6. FIGS. 4H–4N show a line fetch after a one line castout. FIG. 4H is identical to FIG. 4A; FIG. 4J is identical to FIG. 4B and FIG. 4K is identical to FIG. 4C. FIG. 4L differs from FIG. 4D only in their fourth cycle, in which in FIG. 4L a CERO command is issued by the BCE(R) because the CH bit was off for the line being addressed, which negates any castout from SIC(R). On the last cycle in FIG. 4L, CD(R) has its EX bit updated to RO state by the CERO command, and FIG. 4K is reentered to search all CDs to verify that no conflict now exists.

The SIC(I) castout operation in FIGS. 4H and 4M is controlled the same as previously described for FIGS. 4A and 4F to make room for the line fetch. Likewise the SIC(I) castout operation overlaps the cross-interrogation operation in FIGS. 4K and 4L, and the line fetch command for MS has been provided and is waiting in the SC queue of MS requests. As soon as the SIC(I) castout is completed to LSB(I), and the final XI pass through FIG. 4K finds no conflict exists, the line fetch can begin from MS to SIC(I) as shown in FIG. 4N.

If not castouts are required when a BCE miss command is issued, the line fetch can begin as soon as an XI pass through FIG. 4K verifies there is no existing conflict.

FIGS. 4C and 4K illustrate the timing for cross-interrogate operations when the MP system is operating in 4KB page mode, i.e. translation page tables address 4KB page units. In this embodiment, the MP may operate in either 4KB or 2KB page mode in which its page tables may access 4KB units or 2KB units, respectively. The significance of the page mode to the subject invention is that virtual address bits used in the cache directory class address differ between the 4KB and 2KB page modes and affect the number of synonym class addresses which must be XI searched in each 32KB SIC. For 4KB page mode, only bit 19 in the class address is a virtual address bit resulting in two class addresses to be searched. In 2KB mode, bits 19 and 20 in the class address are virtual address bits resulting in four class addresses to be searched. These virtual bits are taken from the logical address before its translation, in order to speed up the cache address time for a requesting CP to a large cache. An adverse result of using virtual bits is that the number of virtual address bits determines the number of synonym classes (as a power of 2) which must be searched in the directory; and the greater the number of virtual bits, the more synonym searching must be done in the directories.

Synonym searching is done in all copy directories (CD). In this embodiment, a separate machine cycle is used simultaneously in all CDs in the MP for searching each original and synonym class of the absolute address in the current BCE miss command. For the 4KB page mode, two cycles are needed to search all CDs for the original and the synonym class as shown in FIGS. 4C and 4K. In 2KB page mode, four cycles are needed to search all CDs for the original and three synonym classes. Thus, in FIGS. 4C and 4K showing 4KB mode, the first cycle searches the original class determined by the absolute address virtual bit 19 in the transmitted XI command. During the next cycle, bit 19 is inverted in the class address to select the only synonym class. In 2KB page mode, four cycles of searching are used in which each synonym class is obtained by a different one of four permutations of the value of virtual bits 19 and 20 to search the original and the three synonym classes in all CDs. This searching performs true synonym searching in CD(I) and conflict synonym searching in each CD(R). If a synonym match is obtained in CD(I) and the CD(I) entry is exclusive, the synonym address is transmitted by the SC to BCE(I), which then accesses the request in that synonym address in its SIC(I) and simultaneously releases the BCE miss command, cancels the MS request, and treats the situation as if no miss had occurred. These operations are performed by the circuits in FIG. 9.

An EX compare is signalled on line 161 in FIGS. 8B and 8A for CD(I), and a RO compare is signalled on line 162 for CD(I). A RO compare signal on line 162 is handled as a conflict in CD(I) and CD(R), via OR circuit 163 in FIG. 8B, and it generates an MP conflict signal in conflict trigger 137 in FIG. 8C.

However, the SC ARO command, and any BCE command resulting from a synonym conflict, will contain the synonym class address instead of the original class address from the XI command being cross-interrogated.

FIGS. 10, 11 and 12 illustrate in detail the CD0 synonym circuits shown in block form in FIG. 8C which control the synonym searching for 2KB or 4KB page mode. A start XI signal from the XIR priority circuit in FIG. 6 initiates the XI search cycle generation in FIG. 11. The first search cycle for all CDs is of the original class address provided in the current BCE(I) miss command from the directory register 121 in FIG. 6, which occurs during the cycle of operation for trigger/latch T1 in FIG. 11. If the 2KB mode signal is active to FIG. 11, 2KB mode synonym searching is performed during the following cycles by T2, T3 and T4. If the 2KB mode signal is inactive to FIG. 11, then 4KB mode synonym searching is performed and only the additional cycle by T2 is used for searching, which involves two less searching cycles than for the 2KB page mode.

The flip 19 and increment 19, 20 outputs from FIG. 11 are provided to FIG. 10 to control the permutations of bits 19 and 20 to obtain the synonym CD class addresses required for the respective CD search cycles. All four line entries in the four sets in each selected CD class are searched.

Figure 14:
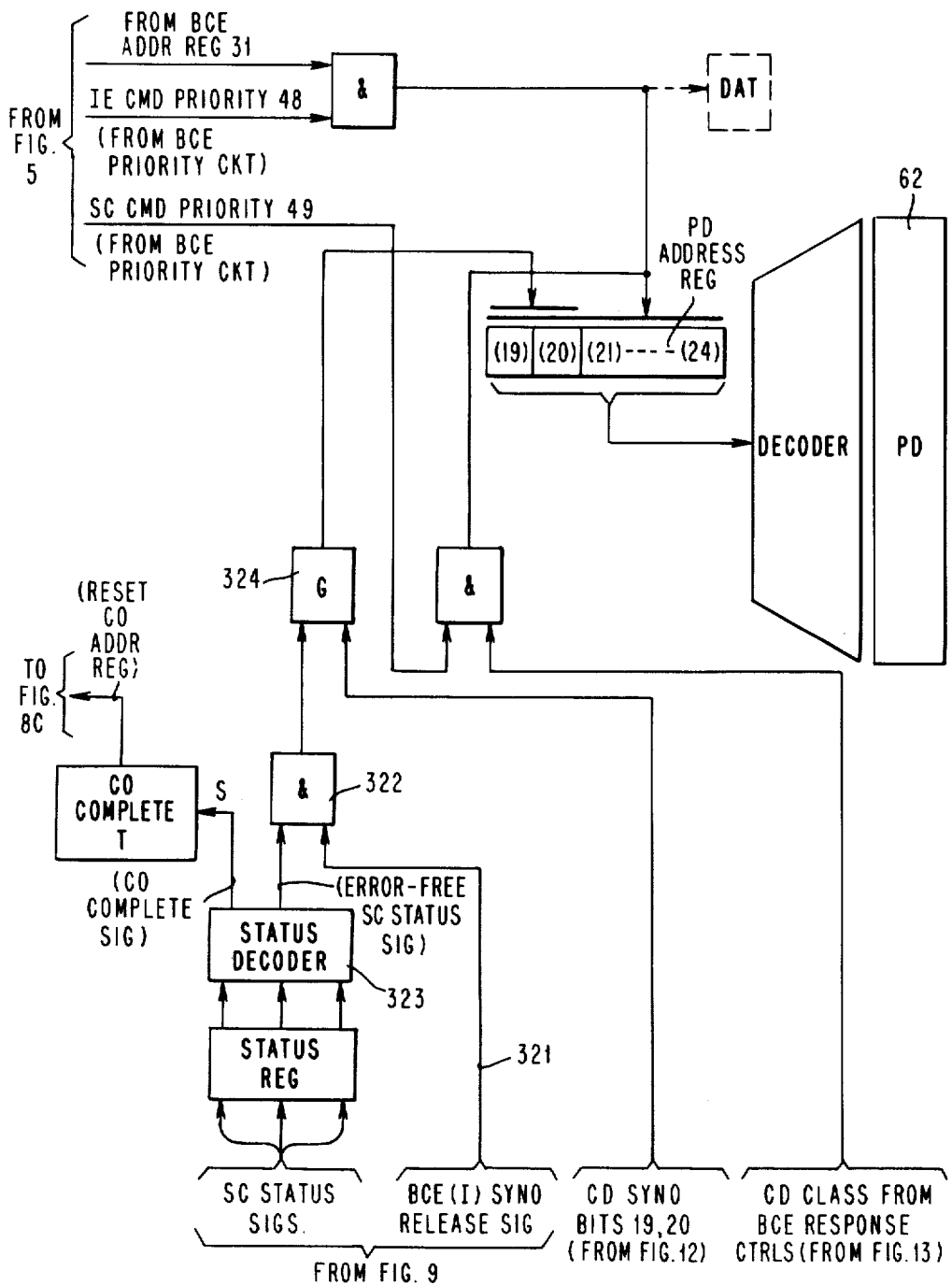
FIG. 14 shows in detail the PD class addressing controls represented in a block in FIG. 5.

The synonym capture circuit in FIG. 12 receives the current class address bits 19 and 20 from FIG. 10 and also receives the associated CD conflict signal on line 130 from FIG. 8B to lock the current state of class address bits 19 and 20 in syno 19 and syno 20 triggers 301 and 302, which provides their outputs to the PD class addressing control circuits in FIG. 14. The remaining bits 21–24 in the class address remain as specified in the current command being searched.

Although the PD addressing control circuit in FIG. 14 is duplicated in every BCE, only the BCE(I) with the issuing CP will accept a synonym address from FIG. 12. This is because in FIG. 14 a line 321 only provides the BCE(I) synonym release signal to identify a synonym to PD(I) which was found in CD(I). Line 321 will not be activated for any conflict (original or synonym) for any PD(R). Line 321 is controlled from a BCE(I) synonym release trigger 320 in FIG. 9. Trigger 320 is set by a signal from a CD(I) exclusive synonym trigger 142 in FIG. 8A, and trigger 142 is set only when the issuing BCE command in the directory register 45 has a PID which identifies CP(0) as the processor which issued the request which caused the current BCE miss being searched by all CDs. Thus trigger 142 in FIG. 8A can only be set when the issuing command's PID activates line 144 to an AND gate 143 when it is actuated for an exclusive synonym detected by that command.

Figure 9:
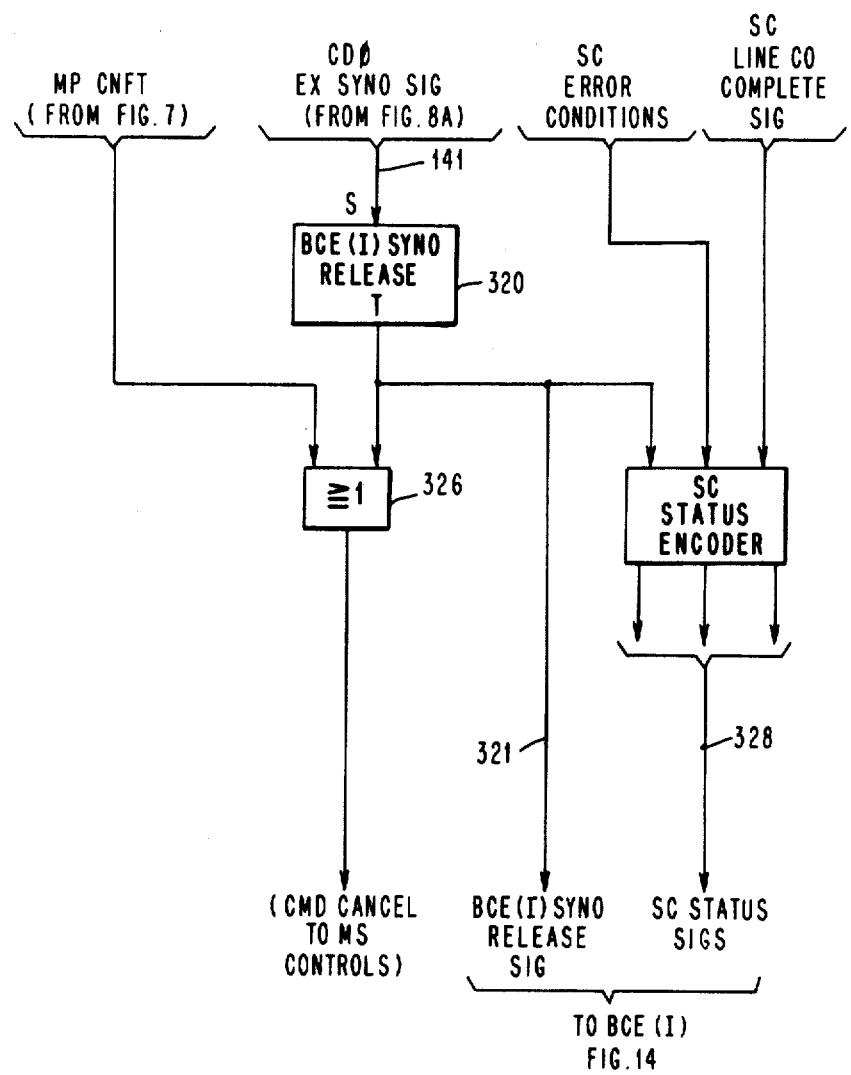

In FIG. 14, line 321 conditions an AND gate 322 which also is conditioned by an output from a status decoder 323 when it indicates an error-free status is being provided from the SC status encoder in FIG. 9.

Thus, line 321 will not be activated to any PD(R), because the PID for each remote CP will not then exist in the current BCE miss command being processed in every SC.

Consequently in FIG. 8C, the detection of an EX compare or RO compare for a synonym class in any CD(R) is handled the same as the detection of an EX compare or RO compare in the principle class indicated in the current BCE miss command, in that any compare generates a conflict signal.

But ax EX compare detected in CD(I) is handled differently, and the principle class cannot provide any compare signal in CD(I) because the lack of such compare may be responsible for the issuance of the BCE(I) miss command. When an exclusive compare is detected in CD(I), it sends a CP(I) exclusive synonym signal on line 141 in FIG. 8A to set the BCE(I) syno release trigger 320 in FIG. 9, which activates AND circuit 322 and gate 324 to pass the captured synonym values of bits 19, 20 into the PD address register so that the PD(I) then accesses this synonym class to find the IE requested data in SIC(I); and the MS request caused by this BCE miss command is cancelled by the output of trigger 320 through OR circuit 326 in FIG. 9. The BCE(I) is thereby released from this BCE miss command and the BCE command register 45 is thereafter available to handle the next command for this BCE.

When the synonym release signal is provided by CD(I), all CD will have completed their XI, searching, and no CD will have found any conflict if the synonym entry in CD(I) had its EX bit on. But if the RO bit is on in the CD(I) synonym entry, conflict(s) may be found in one or more CD(R) and invalidation is performed in this case for the CD(I) entry and any CD(R) entry as necessary for the normal XI hit rules. Table 2 shows each cast and the resulting action taken for it.

Figure 15:
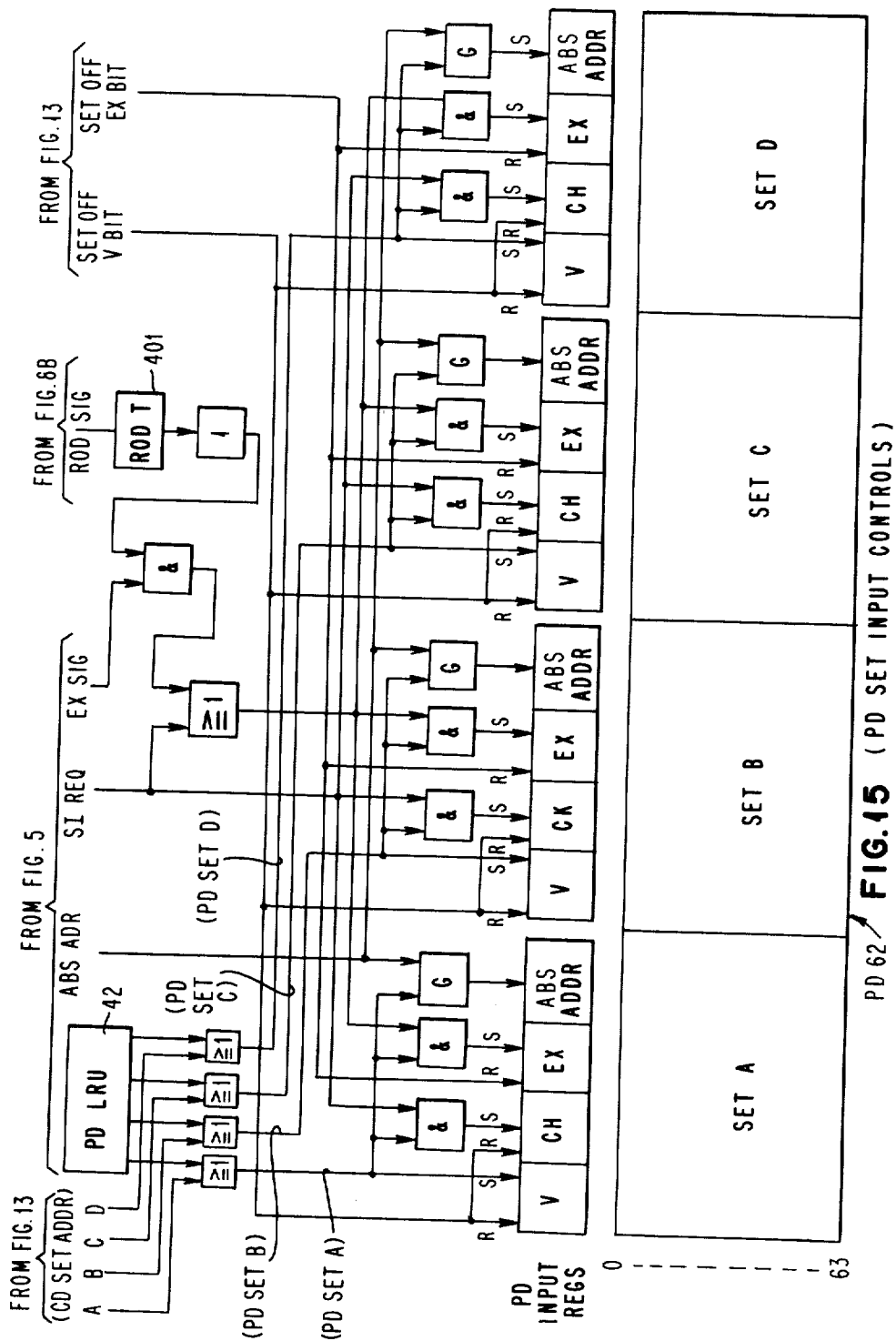
FIG. 15 shows in detail the PD set input controls shown in a block in FIG. 5.

Hence whenever the current CP request activates EX line 24 in FIG. 5 for an exclusive fetch request, an AND gate 136 in FIG. 8B determines that the EX tag bit for the requested line, whether in the principle or a synonym class, will be set according to the rules given in Table 1 herein. If the RO state is to exist, gate 136 provides a CD(I) ROD signal on line 137 to the ROD trigger 401 in FIG. 15, which sets the EX bit to RO state in the particular PD input register for the set chosen by the PD LRU circuit associated with the issuing CP(I). The states of the V bit, CH bit and absolute address bits 6–20 for the line fetch entry into PD(I) are also controlled in FIG. 15.

A conflict signal is provided whenever any remote processor CD(R) detects any principle or synonym address except for an RO synonym found for a RO processor request, or whenever the issuing processor CD(I) detects a RO synonym address in response to an SI request from the issuing processor. Remote processor CD(R) conflicts are explained using Table 1 and the previously discussed examples in FIGS. 4A-G and 4H-N. Issuing processor CD(I) conflicts are explained using Table 2 and the examples in FIGS. 4P-R and 4S-X.

It must be pointed out that a synonym conflict can occur in a uniprocessor system, as well as in a multiprocessor system; a uniprocessor can not have any remote CP conflict.

In Table 1, the respective rows represent the different combinations which can exist for: the different processor request types in an XI command, and the RO and EX types for a line address found in a remote processor CD(R). The particular cases of a RO processor fetch request (or an SVP or channel processor fetch request) finding a RO line address in CD(R) is not a true conflict, because all processors can share such a RO line for RO fetch requests without any directory changes. These non-conflict situations are represented by the 1st, 4th, and 10th rows in Table 1. All of the other rows in Table 1 represent conflict situations, because they require a directory change, which is done by an SC command from any remote CD(R) that finds a conflict to its respective PD(R), which is shown for all rows in Table 1 other than the 5th row.

Signalling from a remote CD(R) having a conflict to the issuing CD(I) is only required when an EX line tag bit in PD(I) is set to EX state by its processor, and it must be changed to RO state by the ATRO signal indicated in the 4th and 6th rows in Table 1.

In Table 2, the respective rows represent the different combinations which can exist for: the different processor request types represented in a BCE miss command (i.e. RO fetch, EX fetch or EX SI), and the synonym type (i.e. RO synonym or EX synonym) found in CD(I). Only the 5th row in Table 2 represents a true conflict situation, because it is the only case requiring any special directory change to an existing entry, which is done by an ILE command from CD(I) to PD(I) to change these directories. None of the other eight cases in Table 2 require any directory modification due to any SC command, although the 2nd, 4th and 6th rows represent special situations involving the transmission of a synonym address from CD(I) to PD(I) to enable the processor to access its data in the synonym line in SIC(I), and the remaining 1st, 3rd, 5th, 7th, 8th and 9th rows represent the normal execution of the BCE miss command obtaining its requested line fetch involving the insertion of a new entry in the PD(I) and CD(I) directories.

The remote CP(R) conflict cases in Table 1 are detected in FIG. 8A by AND gates 166, 167, 168 and 169. All conflicts are signalled by the output of an OR circuit 164 in FIG. 8A which receives the outputs of gates 166 through 169. The issuing processor CP(I) conflict case in Table 2 is also detected by AND gate 169.

In more detail, an EX synonym is detected by an EX compare (EX CMPR) signal 161 from comparator 171 in FIG. 8C, and an RO synonym is detected by an RO compare (RO CMPR) signal 162 from comparator 171. Thus, gate 166 detects an EX synonym found for any SVP or channel processor request. Gate 167 detects a RO synonym found for a SVP or channel store request. Gate 168 detects an EX synonym found for any remote CP(R) request (but not for a CP(I) request). Gate 169 detects a RO synonym found for a SI request from any remote CP(R) or issuing processor CP(I).

For an issuing processor CP(I), a detected conflict indicates a synonym is found in CD(I), although most synonyms are not detected as conflicts. The synonym capture circuit in FIG. 12 detects all synonyms and reports each of their class locations to PD(I).

Detected EX synonyms are handled differently from detected RO synonyms for the following reason: a statistical determination finds that system performance is improved if synonym detection is used (1) to eliminate the synonym and to copy its data into the principle location, rather than (2) accessing the requested data in the synonym location in SIC(I). It has been statistically determined that it is most likely that more requests will follow to a line found at a synonym location, and that relocating that line in the principle class will avoid generating cache misses (required for accessing the line in the synonym location), thereby eliminating such subsequent cache misses with their significant cross-interrogation and synonym checking overhead. However, this cannot be done for an EX entry locked during a checkpoint interval. (Checkpointing is defined in U.S. Pat. No. 3,736,566.) An EX entry may be locked, and then it cannot be invalidated or castout during a checkpoint interval. However, an RO entry is never locked during a checkpoint interval and therefore it can be then invalidated and castout, if required.

Therefore, if a RO synonym is found in CD(I), a true miss is recognized because the MS line fetch is made (see Table 2), a new entry location in SIC(I) is selected in the principle class by the LRU replacement selection circuitry (which new location will not contain a locked entry to be replaced), any valid line represented by the unlocked replacement entry is castout of SIC(I), the new SIC(I) location receives the line fetch, the new location in CD(I) and PD(I) receives the new entry which is designated either RO or EX as explained in regard to Table 1, and for a processor store request having a RO synonym found in CD(I) the synonym is invalidated due to the EX designation required for the new principle entry.

If an EX synonym is found in CD(I), a SC command specifies the EX synonym location to PD(I), which accesses the data in SIC(I), and the line fetch command to main storage is then cancelled, so that no MS line fetch is made. Thus, an EX synonym is accessed in SIC(I) moving it to the principle class, because a processor deadlock may result if an attempt is made to move a locked line from the synonym class to the principle class in the cache. The deadlock occurs because a changed EX location cannot be castout while its line is locked during a checkpoint interval, and the checkpoint interval cannot be completed by the I-unit until it gets the data requested from the line fetch which cannot be obtained until after the castout (which cannot be done) is completed.

FIGS. 4P through 4R illustrate a timing sequence example for a BCE miss command which finds an EX synonym in CD(I). FIGS. 4S through 4X illustrate a timing sequence example in which a BCE miss command finds an RO synonym in CD(I).

The first cycle for the EX synonym example in FIG. 4P represents a miss detection in PD(I) due to a CP(I) fetch request and the issuance of the BCE miss command. The next cycle illustrates the castout of the first DW of any valid changed line selected by the LRU for replacement in the principle class of the current request. This castout occurs into the line store buffer (LSB) in the same manner as described for FIGS. 4A or 4H, and begins before any synonym can be detected. If an EX synonym is subsequently detected, it will squelch the castout (but an RO synonym will not squelch the castout).

FIG. 4Q begins in the manner previously described for FIG. 4B in which the SC PIR(I) is loaded, then the XIR(I) is loaded while the local SC, i.e. SC(I), remains busy handling the BCE(I) miss command. In the following cycle which is the first cycle in FIG. 4R, the directory registers 121 (D regs) in all SC's are loaded, and all CD's are searched in their principle class. In the next cycle in FIG. 4R, the CDs are searched in their synonym class (for 4K page mode). On the third cycle, all SC's wait to determine if any conflict has been detected in CD(I) or in any CD(R) by a remote conflict signal on the XI bus as a result of such searches. If no conflict is detected in any remote CD(R) or the local CD(I), and a RO synonym is detected in the local CD(I) due to a fetch request (represented by either the 2nd or 4th row in Table 2), the fourth cycle in FIG. 4R is entered. During the fourth cycle in FIG. 4R, the EX synonym signal detected by trigger 142 in FIG. 8A causes a BCE(I) synonym release signal on line 321 to reset the LSB(I) as shown in the reset LSB(I) cycle in FIG. 4P which prevents any subsequent transfer of the castout into LSB(I), cancels the corresponding line fetch command to MS, and thereby ends execution of the BCE miss command. The EX synonym signal in FIG. 8A sets the BCE(I) synonym release trigger 320 in FIG. 9 which generates a command cancel signal to the main storage controls in the SC to cancel the line fetch command to main storage initiated by this BCE miss command.

Then finally in FIG. 4P, the PD(I) is caused to select its EX synonym entry after the BCE(I) synonym release signal is received on line 321 in FIG. 14, the CD(I) synonym address bits 19 and 20 are received from FIG. 12, and the CD(I) class address bits 21-24 are contained in the current CD(I) command to the BCE(I). PD(I) controls SIC(I) to access the doubleword being requested, which is provided to IE(I) as the last cycle shown in FIG. 4P. The IE request is now satisfied.

The RO synonym examples in FIG. 4S also begins with a BCE miss command resulting from a processor SI request. The LRU selects in the principle class in PD(I) one entry (among the four sets A-D) for replacement which is not locked and is therefore immediately available for replacement. Then LSB(I) receives a castout of any valid and changed line in the LRU selected replacement location. In this case, LSB(I) is not reset, because an RO synonym is detected. EX synonym trigger 142 is not set when an RO synonym is detected.

The BCE miss command is received by PIR(I) in SC(I) during the first cycle in FIG. 4T which begins similarly to the operation described for FIG. 4Q. Also, FIG. 4U begins the synonym and XI searching similarly to that described for FIG. 4R. During the third cycle in FIG. 4U, a conflict may or may not be detected for an RO synonym.

The fourth cycle in FIG. 4U is reached if no synonym is found or if a RO synonym is found for a processor fetch request (but not for a SI request). Then no command is generated and the EX synonym trigger 142 is not set and indicates no EX synonym was found. Then the line fetch command to main storage remains active, and it begins in FIG. 4W with the requested DW(N) which is provided simultaneously both to IE(I) and to SIC(I) during the first cycle in FIG. 4W. The completion of the castout from the LSB to MS begins in FIG. 4X as soon as the line fetch in FIG. 4W is completed.

If the conflict case of an RO synonym is found for a processor SI request, then the first cycle in the sequence shown in FIG. 4V is entered. In the next cycle in FIG. 4V, the V bit in this RO synonym entry in PD(I) is set to invalid state. The third cycle in FIG. 4V represents the issuance of an ILE command by BCE(I) to SC(I) to invalidate the corresponding RO synonym line entry found in CD(I), which ends its conflict state. Then the beginning of the sequence shown in FIG. 4U is reentered, after which all of the CDs in the system are again searched, because now no conflict is found in CD(I) since the RO synonym entry which previously caused the conflict is now invalid and does not now cause any conflict signal. Therefore, the fourth cycle in FIG. 4U is entered since no conflict is found, and then the line fetch in FIG. 4W is initiated. Whenever the line fetch is completed, the castout line in the LSB(I) is transferred to MS as shown in FIG. 4X.

In summary, the definition of a "conflict" in this detailed description is a compare-equal output from any XI compare operation for any CD that results in a SC command to the corresponding BCE for changing an existing entry in the corresponding PD, whether for a remote or issuing CP. (Thus, a RO compare for a RO processor request is not a conflict, and for the issuing processor the only conflict is a RO compare for a SI request.)

Figure 18:
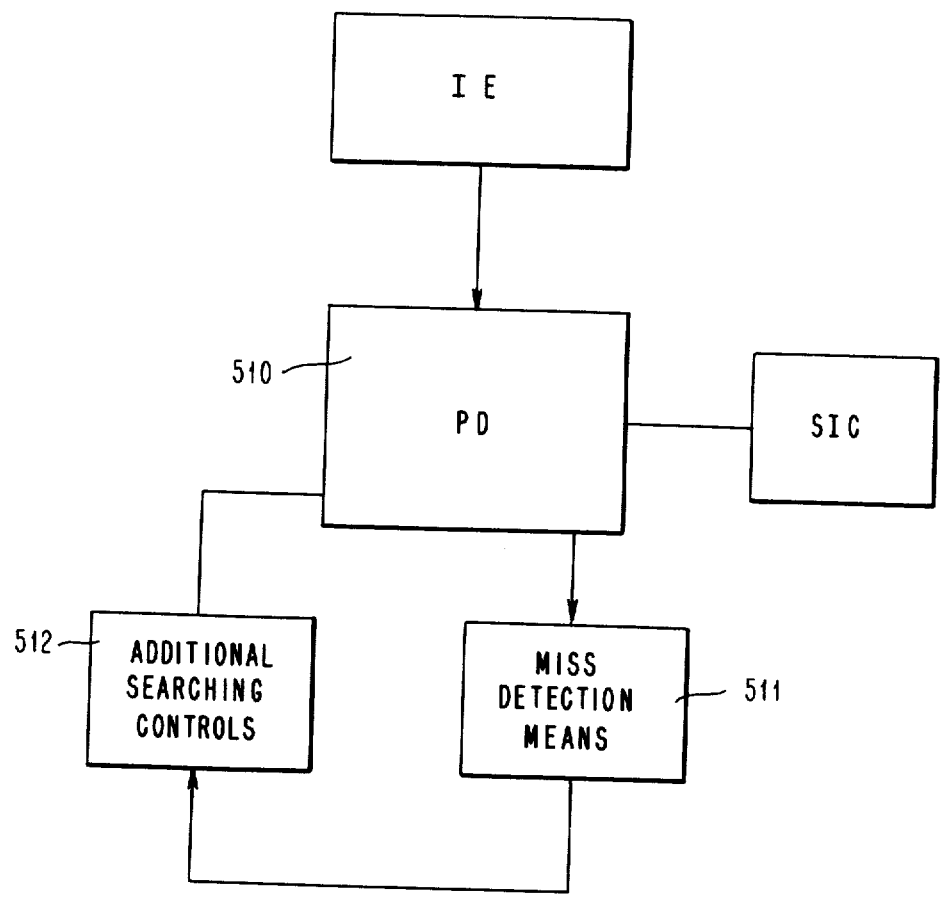
FIG. 18 illustrates a second embodiment of the invention.

A second embodiment of the invention is shown in FIG. 18. It implements the invention entirely with the processor directory (PD) without using any copy directory (CD). This second embodiment includes the miss detection means shown in FIG. 17, which signals the additional searching means 512 upon a cache miss to search the PD 510 for any potential synonym class in the manner described herein for searching the synonym classes in the CD by permitting the translatable bits in the class address. Controls 512 include from FIG. 8C the synonym search alter circuits 212, the synonym capture circuits 213, and directory addressing circuits 211 which in FIG. 18 will operate only in relation to the PD address register in FIG. 14 to control the sequential selection of the synonym classes in PD510. The synonym comparisons are done in the PD address compare circuits in FIG. 17, rather than in the XI compare circuit 171 with the CD in FIG. 8C, which are conventional directory comparison circuits. Any synonym location detected during such synonym search is either accessed by the processor from the synonym location or is copied into the primary location in the same manner as described for the previously described first embodiment.

This second embodiment is not the preferred embodiment for an MP because it results in a degradation in processor performance due to extending the PD(I) operations and search time to include the sequential searching of each synonym class. Such single directory embodiment with each central processor in an MP reduces performance due to the additional interference of cross-interrogation. (The CD was provided to relieve the PD of the XI interference in the preferred first embodiment.) However, in a uniprocessor not having cross-interrogation, this second embodiment has less degradation in system performance than in an MP, and could in the uniprocessor situation sometimes become a preferred way to implement the invention when considering the cost reduction obtained by the elimination of the CD and its control.

Having thus described our invention, what we claim as new and desire to secure by Letters Patent is:

1. Cache synonym control means for a data processing system having a store-in-cache (SIC) and an instruction execution unit (IE), comprising:
set-associative cache directory means for receiving main storage logical address requests from the IE,
address translation means for translating the logical address of an IE request into a requested translated address in main storage,
class registering means for addressing classes in the set-associative directory means, the class registering means receiving a subset of bits in the requested logical address for providing a class address for selecting a class in the cache directory means, the subset of bits containing translatable bits and nontranslatable bits and defining the address of a principle class,
search control means receiving the content of the class registering means and initially searching the cache directory means for the principle class in the class registering means, the search control means generating a miss signal if the translated address is not found in the principle class,
address altering means responding to the miss signal by permutating the translatable bits of the principle class to a permutated value, the address altering means providing the permutated value to overlay the translatable bits in the class registering means to generate a synonym class address, additional search control means to control the search in the directory means of each synonym class address provided to the class registering means by the address altering means, means for actuating the address altering means to generate a next permutated value for the class registering means after each class search controlled by the additional search control means, means for capturing any permutated address in the address altering means for which the additional search control means finds the translated address in the cache directory means or indicates the translated address is not found in any synonym class address, and means for accessing the SIC for data located at the permutated address captured by the capturing means, whereby the capturing means detects any synonym class existing in the cache or detects that no synonym class exists.

2. Cache synonym control means as defined in claim 1, in which the set-associative cache directory means comprises,
a processor cache directory (PD), and
the additional search control means controlling the search for synonym entries in the PD.

3. Cache synonym control means as defined in claim 1, further comprising,
a plurality of line entries in the set-associative cache directory means associated with corresponding line positions in the SIC, each line position in SIC containing a plurality of word storage positions,
an exclusive/readonly (EX) shareability bit position being provided in each line entry to control whether data in the corresponding storage positions in SIC can be duplicated in the respective SIC or in another SIC for another IE in the data processing system,
each line entry also containing a high-order position of the translated address assigned to the line entry,
the search control means further comprising:
means for detecting the state of the EX bit in a synonym line entry when the capturing means detects a synonym class having the requested translated address,
whereby the manner of accessing the synonym line in the SIC corresponding to the detected synonym line entry is controlled by the detected state of the EX bit in the detected synonym line entry.

4. Cache synonym control means as defined in claim 3, in which the search control means further comprises
comparator means for comparing the address in each assigned entry in each class selected by the additional search control means, a comparator output of the additional search control means providing an EX compare signal or an RO compare signal for any line entry having the EX bit position in the exclusive or readonly state and having an assigned translated address equal to a corresponding portion of the requested translated address,
whereby a synonym line entry is the line entry causing the EX compare signal or RO compare signal.

5. Cache control means as defined in claim 4, further comprising
means for sensing an EX compare signal in the presence of the miss signal being caused by any IE request in order to generate a synonym access signal,
means for accessing the requested data in SIC in the synonym line in response to the synonym access signal, and
means for cancelling the miss signal to prevent a line fetch in main storage in response to the synonym access signal from the sensing means,
whereby an available synonym line is acessed in SIC when a miss signal is generated for an IE fetch or store interrogate request for exclusive or readonly data which finds a synonym line entry marked exclusive.

6. Cache control means as defined in claim 4, further comprising
means for sensing a RO compare signal in the presence of the miss signal being caused by an IE fetch request in order to generate a principle access signal,
replacement entry control means assigning an entry location in the principle class of the cache directory for receiving a new entry in response to the miss signal,
means for transferring the requested data in SIC from the synonym class location to the principle class location assigned by the replacement entry control means in response to the sensing means providing a principle access signal,
means for setting the new entry in the cache directory to represent RO data for the IE fetch request,
means for accessing the requested data in SIC at the principle class after operations are completed by the setting means and transferring means,
whereby duplicate RO entries exist in the principle and synonym classes in SIC and the cache directory means.

7. Cache control means s defined in claim 4, further comprising
means for sensing a RO compare signal due to a miss signal caused by an IE store interrogate request in order to generate a principle access signal,
replacement entry control means assigning an entry location in the principle class of the cache directory for receiving a new entry in response to the miss signal,
means for fetching a line in main storage due to the miss signal and placing the fetched line in SIC in the principle class at a line location corresponding to the entry location assigned by the replacement entry control means,
means for setting the EX bit position to EX state in the new entry,
means for setting invalid the synonym entry indicated by the RO compare signal in response to the principle access signal from the sensing means,
means for accessing subsequent requests for data in the same line at the SIC principle class location,
whereby the new principle entry is in exclusive state and does not have any synonym entry in the cache directory means.

8. Cache synonym control means as defined in claims 1, 2, 3, 4, 5, 6 or 7 in which the set-associative cache directory means comprises,
a processor cache directory (PD) and a corresponding copy directory (CD) containing a copy of essential information in each entry in the corresponding PD, the additional search control means controlling the searching in the CD for synonym entries.

9. Cache control means in which the invalidating means in claim 7 further comprises, command means for communicating a line invalidating command from the additional search control means for the CD to PD control means for invalidating the synonym line entry in PD.

10. Cache synonym control means for a data processing system having a store-in-cache (SIC) and an instruction execution unit (IE), comprising a processor directory (PD) for receiving main storage logical address requests from the IE, address translation means for translating the requested logical addresses to translated addresses, PD control means for searching the PD in a principle class address obtained from a subset of virtual bits and non-translatable bits of a requested logical address and generating a miss signal if the translated logical address is not represented in the principle class, a copy directory (CD) contains a class copy PD line entry although not all information in each PD line entry need be found in each corresponding CD line entry, CD control means actuated by the miss signal for searching each valid set in the CD class accessed by the class address to find the translated address, means for permutating the virtual bits in the class address to a next permuted value after each CD search for the same miss signal to determine a next synonym class to be searched by the CD control means for the translated address, means for capturing the next permuted value as a synonym class address if the translated address is found by the CD control means in the class addressed by the next permuted value, whereby the capturing means detects a synonym class in the SIC.

11. Cache synonym control means as defined in claim 10, further comprising a plurality of corresponding line entries in the PD and CD associated with corresponding line positions in the SIC, each line position in SIC containing a plurality of word storage positions, an exclusive/readonly (EX) shareability control bit position being provided in each line entry in PD and CD to control whether data in the corresponding word storage positions in SIC can be duplicated in the respective SIC or in another SIC for another IE in the data processing system, each line entry in PD and CD also containing a high-order portion of the translated address assigned to the line entry, the search control means further comprising:

means for detecting the state of the EX bit position in a synonym line entry in the CD when the capturing means operating under control of the CD control means detects a synonym class having the requested translated address, whereby the manner of accessing the synonym line in the SIC corresponding to the detected synonym line entry is controlled by the detected state of the EX bit position in the detected synonym line entry in CD.

12. Cache synonym control means as defined in claim 11, in which the CD control means further comprises, comparator means connected to CD for comparing the address in each assigned entry in each class selected by the CD control means, a comparator output of the CD control means providing an EX compare signal or an RO compare signal for any line entry having the EX bit state in the exclusive or readonly state respectively and having an assigned translated address equal to a corresponding portion of the requested translated address, whereby a synonym line entry is the line entry causing the EX compare signal or RO compare signal.

13. Cache control means as defined in claim 12, the CD control means further comprising means for sensing an EX compare signal from the comparator means in the presence of the miss signal being caused by any IE request in order to generate a synonym access signal, means for communicating to the PD control means in the directory location of the synonym line entry found in CD for accessing the requested data in SIC in the synonym line in response to the synonym access signal, and the CD control means also concurrently providing a line fetch request signal to main storage in response to a miss signal from the PD control means, means for cancelling the line fetch request signal to main storage to prevent a line fetch from main storage in response to the sensing means providing the synonym access signal, and means for accessing the IE request at the synonym line location in SIC when a miss signal is generated for an IE fetch or store interrogate request for exclusive or readonly data which finds an exclusive synonym line entry.

14. Cache control means as defined in claim 12, further comprising the PD control means further including:

replacement entry control means assigning an entry location in the principle class for receiving a new entry, the CD control means further including:

means for sensing a RO compare signal with the CD control means from the comparator means in the presence of the miss signal being caused by an IE fetch request in order to generate a principle access signal, means for fetching a line in main storage due to the miss signal and placing the fetched line in SIC in the principle class at a line location corresponding to the entry location assigned by the replacement entry control means, means for accessing the requested data in SIC in the fetched line in SIC in the principle class in response to the sensing means providing a principle class signal; and communicating means for setting the EX bit in the new entry to RO state in both PD and CD, whereby duplicate RO entries exist in the principle and synonym classes in the cache directory means.

15. Cache control means as defined in claim 12, further comprising, the PD control means further including:

replacement entry control means assigning an entry location in the principle class for receiving a new entry, the CD control means further including:

means for sensing a RO compare signal due to a miss signal caused by an IE store interrogate request in order to generate a principle access signal, means for fetching a line in main storage due to the miss signal and placing the fetched line in SIC in the principle class at a line location corresponding to the entry location assigned by the replacement entry control means, means for invalidating the synonym line entry in response to the principle class signal, and means for accessing subsequently requested data in SIC at the same line address in the fetched line in SIC in the principle class in response to the sensing means providing a principle class signal, whereby the new line entry has its EX bit set to exclusive state and it does not have any duplicate line entry in the cache directory means.

* * * * *